US010556705B2

(12) United States Patent
Xiao et al.

(10) Patent No.: US 10,556,705 B2
(45) Date of Patent: *Feb. 11, 2020

(54) METHOD AND SYSTEM FOR RECYCLING MOTOR POWER OF A MOVABLE OBJECT

(71) Applicant: SZ DJI TECHNOLOGY CO., LTD., Shenzhen (CN)

(72) Inventors: Wenlong Xiao, Shenzhen (CN); Xiaojian Wan, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/273,716

(22) Filed: Feb. 12, 2019

(65) Prior Publication Data

US 2019/0168885 A1  Jun. 6, 2019

Related U.S. Application Data

(63) Continuation of application No. 15/824,721, filed on Nov. 28, 2017, now Pat. No. 10,239,629, which is a
(Continued)

(51) Int. Cl.
*B64D 31/06* (2006.01)
*B60L 15/02* (2006.01)
(Continued)

(52) U.S. Cl.
CPC ............. *B64D 31/06* (2013.01); *B60L 7/10* (2013.01); *B60L 15/025* (2013.01);
(Continued)

(58) Field of Classification Search
CPC .... B64D 31/06; B64D 27/24; B64D 2221/00; B60L 15/2045; B60L 15/025; B60L 7/10;
(Continued)

(56) References Cited

U.S. PATENT DOCUMENTS 6,193,464 B1   2/2001   Nyhus et al.
2011/0162900 A1  7/2011   Chen et al.
(Continued)

FOREIGN PATENT DOCUMENTS

CN   2471606 Y   1/2002
CN   2764648 Y   3/2006
(Continued)

OTHER PUBLICATIONS

World Intellectual Property Organization (WIPO) International Search Report and Written Opinion for PCT/CN2014/090957 dated Jun. 29, 2015 11 Pages.
(Continued)

*Primary Examiner* — Christian Chace
*Assistant Examiner* — Jordan S Fei
(74) *Attorney, Agent, or Firm* — Anova Law Group, PLLC

(57) ABSTRACT

A method of redistributing motor power of an unmanned aerial vehicle (UAV) includes determining, with aid of one or more processors, an operating state of a motor of the UAV. The motor is configured to drive a corresponding rotor to generate lift for the UAV. The method further includes determining, with aid of the one or more processors, how to redistribute power from the motor between a plurality of components when the motor has an operating state that is a decelerating state, and redistributing the power in accordance with the determination of how to redistribute the power.

20 Claims, 11 Drawing Sheets

Related U.S. Application Data continuation of application No. 15/597,085, filed on May 16, 2017, now Pat. No. 9,856,033, which is a continuation of application No. 15/143,265, filed on Apr. 29, 2016, now Pat. No. 9,868,363, which is a continuation of application No. PCT/CN2014/090957, filed on Nov. 12, 2014.

(51) Int. Cl.
| | |
|---|---|
| *B60L 7/10* | (2006.01) |
| *B64C 39/02* | (2006.01) |
| *B64D 27/24* | (2006.01) |
| *H02P 3/14* | (2006.01) |
| *H02P 5/74* | (2006.01) |
| *B60L 15/20* | (2006.01) |
| *B60L 7/14* | (2006.01) |
| *B60L 7/12* | (2006.01) |
| *B60L 7/16* | (2006.01) |
| *B60L 7/18* | (2006.01) |

(52) U.S. Cl.
CPC ........ *B60L 15/2045* (2013.01); *B64C 39/024* (2013.01); *B64D 27/24* (2013.01); *H02P 3/14* (2013.01); *H02P 5/74* (2013.01); *B60L 7/12* (2013.01); *B60L 7/14* (2013.01); *B60L 7/16* (2013.01); *B60L 7/18* (2013.01); *B60L 2200/10* (2013.01); *B64C 2201/042* (2013.01); *B64C 2201/066* (2013.01); *B64C 2201/108* (2013.01); *B64D 2221/00* (2013.01); *Y02T 10/643* (2013.01); *Y02T 10/72* (2013.01); *Y02T 10/7283* (2013.01)

(58) Field of Classification Search
CPC ...... B60L 7/18; B60L 7/16; B60L 7/12; B60L 7/14; B60L 2200/10; H02P 5/74; H02P 3/14; B64C 39/024; B64C 2201/108; B64C 2201/066; B64C 2201/042; Y02T 10/72; Y02T 10/643; Y02T 10/7283

See application file for complete search history.

(56) References Cited

U.S. PATENT DOCUMENTS

| | | |
|---|---|---|
| 2012/0056600 A1 | 3/2012 | Nevin |
| 2012/0153880 A1 | 6/2012 | Cerrato et al. |
| 2012/0298793 A1 | 11/2012 | Weddendorf et al. |
| 2012/0319625 A1 | 12/2012 | Thomas et al. |
| 2013/0094963 A1 | 4/2013 | Rolt |
| 2013/0264991 A1 | 10/2013 | De Souza |
| 2013/0293005 A1 | 11/2013 | Pecnik et al. |
| 2014/0129056 A1 | 5/2014 | Criado |
| 2016/0052626 A1 | 2/2016 | Vander Mey |
| 2016/0244176 A1 | 8/2016 | Xiao et al. |

FOREIGN PATENT DOCUMENTS

| | | |
|---|---|---|
| CN | 101450663 A | 6/2009 |
| CN | 102508237 A | 6/2012 |
| CN | 102510815 A | 6/2012 |
| CN | 102555762 A | 7/2012 |
| CN | 102649394 A | 8/2012 |
| JP | 2000078704 A | 3/2000 |
| JP | 2001095272 A | 4/2001 |
| JP | 2008271775 A | 11/2008 |
| JP | 2010187480 A | 8/2010 |
| JP | 2010208501 A | 9/2010 |
| JP | 2013010499 A | 1/2013 |
| JP | 2013110912 A | 6/2013 |
| JP | 2013525185 A | 6/2013 |
| JP | 2013169972 A | 9/2013 |
| JP | 2014129047 A | 7/2014 |
| JP | 2016507414 A | 3/2016 |
| WO | 2013084461 A1 | 6/2013 |
| WO | 2013088464 A1 | 6/2013 |
| WO | 2014091092 A1 | 6/2014 |
| WO | 2014161428 A1 | 10/2014 |

OTHER PUBLICATIONS

Johnson-Kinlaw. Regenerative braking. Posted May 13, 2012. http://diydrones.com/forum/topics/regenerative-braking.

Taylor. Micro UAV range extension. Department of Electrial Engineering at Technikon SA thesis. Oct. 1, 2012.

The United States Patent and Trademark Office (USPTO) Notice of Allowance (2nd) for U.S. Appl. No. 15/143,265 dated Apr. 20, 2017 2 Pages.

The United States Patent and Trademark Office (USPTO) Notice of Allowance for U.S. Appl. No. 15/143,265, dated Apr. 5, 2017 8 Pages.

The United States Patent and Trademark Office (USPTO) Office Action for U.S. Appl. No. 15/143,265, dated Jul. 15, 2016 8 Pages.

The United States Patent and Trademark Office (USPTO) Office Action for U.S. Appl. No. 15/143,265 dated Dec. 23, 2016 10 Pages.

METHOD AND SYSTEM FOR RECYCLING MOTOR POWER OF A MOVABLE OBJECT

CROSS-REFERENCE

This application is a continuation application of U.S. application Ser. No. 15/824,721, filed on Nov. 28, 2017, which is a continuation application of U.S. application Ser. No. 15/597,085, filed on May 16, 2017, now U.S. Pat. No. 9,856,033, which is a continuation application of U.S. application Ser. No. 15/143,265, filed on Apr. 29, 2016, now U.S. Pat. No. 9,868,363, which is a continuation application of International Application No. PCT/CN2014/090957, filed on Nov. 12, 2014, the entire contents of all of which are hereby incorporated by reference.

BACKGROUND OF THE DISCLOSURE

Aerial vehicles, such as unmanned aerial vehicles (UAVs), can be used for performing surveillance, reconnaissance, and exploration tasks for military and civilian applications. During the flight, such aerial vehicles may continuously change or maintain the speed, height, posture, acceleration thereof to perform a specific function.

In some instances, it may be desirable for a multi-rotor aerial vehicle, such as a multi-rotor UAV, to vary the power of each power component (e.g., a propeller and a motor) among the plurality, in order to implement various flight control schemes. However, during a decelerating state of a motor, the excess power generated from kinetic energy of the motor in a preceding accelerating state may simply be consumed by damping of power components, which lowers the energy efficiency of the UAV.

SUMMARY OF THE DISCLOSURE

In some instances, in order to increase the energy efficiency and increase a battery life, it may be desirable for an aerial vehicle, such as an unmanned aerial vehicle (UAV), to recollect the power generated by the kinetic energy of motors of the UAV, particularly the kinetic energy of those motors in a decelerating state. The present disclosure provides methods and systems for recycling the power from one or more motors of a movable object such as a UAV. The methods and system of present disclosure may determine an operating state of at least one motor of the movable object such as a UAV while the UAV is in flight, and recycle power generated by the kinetic energy from the at least one motor when the motor has a decelerating state. The recycled power from the at least one motor may include an electrical current generated by a back electromotive force (BEMF) of the motor.

Methods and systems may also be provided to redistribute the recycled motor power of a movable object such as a UAV. Multiple motors of the UAV may be connected in parallel to a shared power bus, through which the power from a battery or battery assembly may be distributed. The recycled motor power may be directly fed to other power consuming components, e.g., other motors in an accelerating state or sensors onboard the UAV, via the power bus. Any remaining power from the other power consuming components may be supplied to the battery. Alternatively, the methods and systems of present disclosure may determine how to redistribute the recycled power between a plurality of power consuming components, and redistribute the recycled power in accordance with the determination.

An aspect of the disclosure may include a method of recycling motor power of a movable object such as an unmanned aerial vehicle (UAV), said method comprising: determining, with aid of a processor, an operating state of at least one motor of the UAV, wherein the at least one motor is used to drive a corresponding rotor that generates lift for the UAV during flight of the UAV; recycling power from the at least one motor when the at least one motor has an operating state that is a decelerating state while the UAV is in flight during which one or more rotors generate lift for the UAV.

In some embodiments, the method may further comprise remotely controlling the flight of the UAV with aid of a remote terminal, while recycling power from the at least one motor.

In some embodiments, the corresponding rotor may generate lift for the UAV while recycling power from the at least one motor takes place. The rotors driven by other motors may generate lift for the UAV while recycling power from the at least one motor takes place.

In some embodiments, recycling power from the at least one motor may comprise converting the kinetic energy from the motor motion to electrical energy. In some embodiments, the decelerating state of the at least one motor is initiated in response to a signal to cause braking of the at least one motor.

In some embodiments, the UAV may comprise a plurality of motors, each configured to drive a corresponding rotor that is configured to generate lift for the UAV during flight of the UAV. The method may further comprise determining an operating state of each motor of said plurality. In some instances, the plurality of motors may have different operating states. Alternatively, the plurality of motors may have the same operating state.

In some embodiments, determining an operating state of the at least one motor may comprise detecting an acceleration of the at least one motor. The at least one motor may have an operating state that is the decelerating state when the acceleration of the at least one motor is negative. In some instances, recycling power from the at least one motor may comprise recycling an electrical current generated by a back electromotive force of the at least one motor.

In some embodiments, determining an operating state of the at least one motor may comprise determining whether a back electromotive force of the at least one motor is higher than a voltage applied on the at least one motor. The at least one motor may have an operating state that is the decelerating state when the back electromotive force of the at least one motor is higher than a voltage applied on the motor. In some instances, recycling power from the at least one motor may comprise recycling an electrical current generated by a back electromotive force of the at least one motor.

In some embodiments, determining an operating state of the at least one motor may comprise determining if a q-axis current of the at least one motor is negative. The at least one motor may have an operating state that is the decelerating state when the q-axis current of the at least one motor is negative. In some instances, recycling power from the at least one motor may comprise recycling an electrical current generated by a back electromotive force of the at least one motor.

In some embodiments, the method may further comprise supplying the recycled power to one or more motors that are not in a decelerating state. In some instances, the method may further comprise supplying excess power that is not supplied to the one or more motors to a battery. The battery may be connected in parallel with the at least one motor through a power bus. In other embodiments, the method may further comprise supplying the recycled power is supplied to a battery.

In some embodiments, recycling power from the at least one motor may be conducted using a field orientation control (FOC) method. In some instances, the FOC method may comprise determining a position of the corresponding rotor.

Another aspect of the disclosure may include a system for recycling motor power of a movable object such as an unmanned aerial vehicle (UAV), said system comprising: at least one motor of the UAV configured to drive a corresponding rotor that is configured to generate lift for the UAV during flight of the UAV; one or more processors configured to, individually or collectively, determine an operating state of the at least one motor of UAV; and at least one energy converter configured to recycle power from the at least one motor when the at least one motor has an operating state that is a decelerating state while the UAV is in flight during which one or more rotors generate lift for the UAV.

In some embodiments, the system may further comprise a remote terminal configured to remotely control the flight of the UAV while recycling power from the at least one motor.

In some embodiments, the corresponding rotor may generate lift for the UAV while recycling power from the at least one motor takes place. The rotors driven by other motors may generate lift for the UAV while recycling power from the at least one motor takes place. The at least one energy converter may be configured to convert the kinetic energy from the motor motion to electrical energy. In some embodiments, decelerating state of the at least one motor is initiated in response to a signal to cause braking of the at least one motor.

In some embodiments, the UAV may comprise a plurality of motors, each configured to drive a corresponding rotor that is configured to generate lift for the UAV during flight of the UAV. The one or more processors are further configured to, individually or collectively, determine an operating state of each motor of said plurality. In some instances, the plurality of motors may have different operating states. In other instances, the plurality of motors may have the same operating state.

In some embodiments, the operating state of the at least one motor may comprise an acceleration of the at least one motor. The at least one motor may have an operating state that is the decelerating state when the acceleration of the at least one motor is negative. In some instances, the power from the at least one motor may comprise an electrical current generated by a back electromotive force of the at least one motor.

In some embodiments, the operating state of the at least one motor may comprise whether a back electromotive force of the at least one motor is higher than a voltage applied on the at least one motor. The at least one motor may have an operating state that is the decelerating state when the back electromotive force of the at least one motor is higher than the voltage applied on the motor. In some instances, the power from the at least one motor may comprise an electrical current generated by a back electromotive force of the at least one motor.

In some embodiments, the operating state of the at least one motor may comprise if a q-axis current of the at least one motor is negative. The at least one motor may have an operating state that is the decelerating state when the q-axis current of the at least one motor is negative. In some instances, the power from the at least one motor may comprise an electrical current generated by a back electromotive force of the at least one motor.

In some embodiments, the system may further comprise a power supplier configured to supply the recycled power to one or more motors that are not in a decelerating state. The power supplier may supply excess power that is not supplied to the one or more motors to a battery. In some instances, the battery is connected in parallel with the at least one motor through a power bus. In other embodiments, the system may further comprise a power supplier configured to supply the recycled power is supplied to a battery.

In some embodiments, the at least one energy converter may recycle power from the at least one motor using a field orientation control (FOC) method. In some instances, the FOC method comprises determining a position of the corresponding rotor.

A method of recycling motor power of a movable object such as an unmanned aerial vehicle (UAV) may be provided in accordance with another aspect of the disclosure. The method may comprise: providing a plurality of motors of the UAV, each configured to drive a corresponding rotor that is configured to generate lift for the UAV during flight of the UAV; and receiving, at a power bus in electrical connection with the plurality of motors, power from at least one motor of the plurality of motors when the at least one motor is decelerating, wherein the power bus is configured to provide power to at least one motor from the plurality of motors when the at least one motor is accelerating.

In some embodiments, the plurality of motors may be connected to the power bus in parallel.

In some embodiments, the method may further comprise providing at least one battery in electrical connection with the power bus. In some instances, the method may further comprise supplying, via the power bus, power received from the at least one motor when the at least one motor is decelerating to the at least one battery. In some instances, the method may further comprise receiving, via the power bus, power from the at least one battery that is provided to the at least one motor when the at least one motor is accelerating.

In some embodiments, the method may further comprise supplying, via the power bus, power received from the at least one motor when the at least one motor is decelerating to at least one other motor of the plurality of motors. In some instances, the at least one other motor is accelerating. In some instances, the method may further comprise supplying via the power bus, power received from the at least one motor when the at least one motor is decelerating to at least one battery when excess power remains after supplying the power to the at least one other motor.

In some embodiments, the power bus may be a direct current (DC) power bus.

In some embodiments, the method may further comprise remotely controlling the flight of the UAV with aid of a remote terminal, while receiving power from the at least one motor.

In some embodiments, the corresponding rotor may generate lift for the UAV while receiving power from the at least one motor takes place. The rotors driven by other motors may generate lift for the UAV while receiving power from the at least one motor takes place.

In some embodiments, receiving power from the at least one motor may comprise converting the kinetic energy from the motor motion to electrical energy. The decelerating of the at least one motor may be initiated in response to a signal to cause braking of the at least one motor.

In some embodiments, the UAV may comprise a plurality of motors, each configured to drive a corresponding rotor that is configured to generate lift for the UAV during flight of the UAV. In some instances, the method may further comprise determining an operating state of each motor of said plurality. In some instances, the plurality of motors may have different operating states. Alternatively, the plurality of motors may have the same operating state.

In some embodiments, the method may further comprise detecting an acceleration of the at least one motor. The at least one motor may have an operating state that is the decelerating state when the acceleration of the at least one motor is negative. In some instances, receiving power from the at least one motor may comprise receiving an electrical current generated by a back electromotive force of the at least one motor.

In some embodiments, the method may further comprise determining whether a back electromotive force of the at least one motor is higher than a voltage applied on the at least one motor. The at least one motor may have an operating state that is the decelerating state when the back electromotive force of the at least one motor is higher than a voltage applied on the motor. In some instances, receiving power from the at least one motor may comprise receiving an electrical current generated by a back electromotive force of the at least one motor.

In some embodiments, the method may further comprise determining if a q-axis current of the at least one motor is negative. The at least one motor may have an operating state that is the decelerating state when the q-axis current of the at least one motor is negative. In some instances, receiving power from the at least one motor comprises receiving an electrical current generated by a back electromotive force of the at least one motor.

In some embodiments, the method may further comprise supplying the received power to one or more motors that are not in a decelerating state. In some instances, the method may further comprise supplying excess power that is not supplied to the one or more motors to a battery. In some instances, the battery may be connected in parallel with the at least one motor through a power bus. In other embodiments, the method may further comprise supplying the recycled power is supplied to a battery.

In some embodiments, receiving the power from the at least one motor may be conducted using a field orientation control (FOC) method. In some instances, the FOC method may comprise determining a position of the corresponding rotor.

A system for recycling motor power of a movable object such as an unmanned aerial vehicle (UAV) may be provided in accordance with another aspect of the disclosure. The system may comprise: a plurality of motors of the UAV, each configured to drive a corresponding rotor that is configured to generate lift for the UAV during flight of the UAV; and a power bus in electrical connection with the plurality of motors, wherein the power bus is configured to (1) provide power to at least one motor of the plurality of motors when the at least one motor is accelerating and (2) receive power from the at least one motor when the at least one motor is decelerating.

In some embodiments, the plurality of motors are connected to the power bus in parallel.

In some embodiments, the system may comprise at least one battery in electrical connection with the power bus. In some instances, the power bus may be further configured to supply, via the power bus, power received from the at least one motor when the at least one motor is decelerating to the at least one battery. In some instances, the power bus may be further configured to receive, via the power bus, power from the at least one battery that is provided to the at least one motor when the at least one motor is accelerating.

In some embodiments, the power bus may be further configured to supply, via the power bus, power received from the at least one motor when the at least one motor is decelerating to at least one other motor of the plurality of motors. In some instances, the at least one other motor may be accelerating. In some embodiments, the power bus may be further configured to supply via the power bus, power received from the at least one motor when the at least one motor is decelerating to at least one battery when excess power remains after supplying the power to the at least one other motor.

In some embodiments, the power bus may be a direct current (DC) power bus.

In some embodiments, the system may further comprise a remote terminal configured to remotely control the flight of the UAV, while receiving power from the at least one motor.

In some embodiments, the corresponding rotor may generate lift for the UAV while receiving power from the at least one motor takes place. The rotors driven by other motors may generate lift for the UAV while receiving power from the at least one motor takes place. In some embodiments, receiving power from the at least one motor may comprise converting the kinetic energy from the motor motion to electrical energy. In some instances, the decelerating of the at least one motor may be initiated in response to a signal to cause braking of the at least one motor.

In some embodiments, the UAV may comprise a plurality of motors, each configured to drive a corresponding rotor that is configured to generate lift for the UAV during flight of the UAV. In some instances, the system may further comprise one or more processors in electrical connection with the power bus, wherein the one or more processors are configured to, individually or collectively, determine an operating state of each motor of said plurality. The plurality of motors may have different operating states. Alternatively, the plurality of motors may have the same operating state.

In some embodiments, the system may further comprise one or more processors in electrical connection with the power bus, wherein the one or more processors are configured to, individually or collectively, detect an acceleration of the at least one motor. The at least one motor may have an operating state that is the decelerating state when the acceleration of the at least one motor is negative. In some instances, the power from the at least one motor may comprise an electrical current generated by a back electromotive force of the at least one motor.

In some embodiments, the system may further comprise one or more processors in electrical connection with the power bus, wherein the one or more processors are configured to, individually or collectively, determine whether a back electromotive force of the at least one motor is higher than a voltage applied on the at least one motor. The at least one motor may have an operating state that is the decelerating state when the back electromotive force of the at least one motor is higher than a voltage applied on the motor. In some instances, the power from the at least one motor comprises an electrical current generated by a back electromotive force of the at least one motor.

In some embodiments, the system may further comprise one or more processors in electrical connection with the power bus, wherein the one or more processors are configured to, individually or collectively, determine if a q-axis current of the at least one motor is negative. The at least one motor may have an operating state that is the decelerating state when the q-axis current of the at least one motor is negative. In some instances, the power from the at least one motor comprises an electrical current generated by a back electromotive force of the at least one motor.

In some embodiments, the power bus may be further configured to supply the received power to one or more motors that are not in a decelerating state. In some instances, the power bus may be further configured to supply excess power that is not supplied to the one or more motors to a battery. The battery may be connected in parallel with the at least one motor through a power bus. In other embodiments, the power bus may be further configured to supply the recycled power is supplied to a battery.

In some embodiments, receiving power from the at least one motor may be conducted using a field orientation control (FOC) method. The FOC method may comprise determining a position of the corresponding rotor.

Another aspect of the disclosure may include a method of redistributing motor power of a movable object such as an unmanned aerial vehicle (UAV), said method comprising: determining, with aid of a processor, an operating state of at least one motor of UAV, wherein the at least one motor is used to drive a corresponding rotor that generates lift for the UAV during flight of the UAV; and redistributing power from the at least one motor when the at least one motor has an operating state that is a decelerating to a power consuming component of the UAV.

In some embodiments, the power consuming component is another motor of the UAV in an accelerating state and configured to drive a corresponding rotor that generates lift for the UAV during flight of the UAV. Alternatively, the power consuming component is a sensor on-board the UAV. Alternatively, the power consuming component is a navigation module on-board the UAV. Alternatively, the power consuming component is a communication module on-board the UAV.

In some embodiments, the method may further comprise redistributing power from the at least one motor to a battery on-board the UAV when excess power remains after distributing the power to the power consuming component.

In some embodiments, the method may further comprise redistributing power from the at least one motor to multiple power consuming components of the UAV. In some instances, the multiple power consuming components of the UAV may be motors in an accelerating state.

In some embodiments, the power may be redistributed to the power consuming component without interacting with intermediary power storage or power consuming components. In some embodiments, the power may be redistributed to the power consuming component via a power bus in electrical connection with the at least one motor and the power consuming component.

In some embodiments, the method may further comprise remotely controlling the flight of the UAV with aid of a remote terminal, while receiving power from the at least one motor.

In some embodiments, the corresponding rotor may generate lift for the UAV while redistributing power from the at least one motor takes place. The rotors driven by other motors may generate lift for the UAV while redistributing power from the at least one motor takes place.

In some embodiments, redistributing power from the at least one motor comprises converting the kinetic energy from the motor motion to electrical energy. The decelerating of the at least one motor may be initiated in response to a signal to cause braking of the at least one motor.

In some embodiments, the UAV may comprise a plurality of motors, each configured to drive a corresponding rotor that is configured to generate lift for the UAV during flight of the UAV. In some instances, the method may further comprise determining an operating state of each motor of said plurality. The plurality of motors may have different operating states. Alternatively, the plurality of motors may have the same operating state.

In some embodiments, the method may further comprise detecting an acceleration of the at least one motor. The at least one motor may have an operating state that is the decelerating state when the acceleration of the at least one motor is negative. In some instances, redistributing power from the at least one motor may comprise redistributing an electrical current generated by a back electromotive force of the at least one motor.

In some embodiments, the method may further comprise determining whether a back electromotive force of the at least one motor is higher than a voltage applied on the at least one motor. The at least one motor may have an operating state that is the decelerating state when the back electromotive force of the at least one motor is higher than a voltage applied on the motor. In some instances, redistributing power from the at least one motor may comprise redistributing an electrical current generated by a back electromotive force of the at least one motor.

In some embodiments, the method may further comprise determining if a q-axis current of the at least one motor is negative. The at least one motor may have an operating state that is the decelerating state when the q-axis current of the at least one motor is negative. In some instances, redistributing power from the at least one motor comprises redistributing an electrical current generated by a back electromotive force of the at least one motor.

In some embodiments, redistributing the power from the at least one motor may be conducted using a field orientation control (FOC) method. The FOC method comprises determining a position of the corresponding rotor.

Another aspect of the disclosure may include a system for redistributing motor power of a movable object such as an unmanned aerial vehicle (UAV), said system comprising: at least one motor of a UAV configured to drive a corresponding rotor that is configured to generate lift for the UAV during flight of the UAV; one or more processors configured to, individually or collectively, determine an operating state of the at least one motor of UAV; and at least one energy distribution unit configured to redistribute power from the at least one motor when the at least one motor has an operating state that is a decelerating state to a power consuming component of the UAV.

In some embodiments, the power consuming component may be another motor of the UAV in an accelerating state and configured to drive a corresponding rotor that generates lift for the UAV during flight of the UAV. Alternatively, the power consuming component may be a sensor on-board the UAV. Alternatively, the power consuming component may be a navigation module on-board the UAV. Optionally, the power consuming component may be a communication module on-board the UAV.

In some embodiments, the at least one energy distribution unit may be further configured to redistribute power from the at least one motor to a battery on-board the UAV when excess power remains after distributing the power to the power consuming component. In some embodiments, the at least one energy distribution unit may be further configured to redistribute power from the at least one motor to multiple power consuming components of the UAV. In some instances, the multiple power consuming components of the UAV may be motors in an accelerating state.

In some embodiments, the power may be redistributed to the power consuming component without interacting with intermediary power storage or power consuming components. In some embodiments, the power may be redistributed to the power consuming component via a power bus in electrical connection with the at least one motor and the power consuming component.

In some embodiments, the system may further comprise a remote terminal configured to remotely control the flight of the UAV while redistributing power from the at least one motor.

In some embodiments, the corresponding rotor may generate lift for the UAV while redistributing power from the at least one motor takes place. The rotors driven by other motors may generate lift for the UAV while redistributing power from the at least one motor takes place.

In some embodiments, redistributing power from the at least one motor may comprise converting the kinetic energy from the motor motion to electrical energy. The decelerating of the at least one motor may be initiated in response to a signal to cause braking of the at least one motor.

In some embodiments, the UAV may comprise a plurality of motors, each configured to drive a corresponding rotor that is configured to generate lift for the UAV during flight of the UAV. The one or more processors may be further configured to, individually or collectively, determine an operating state of each motor of said plurality. The plurality of motors may have different operating states. Alternatively, the plurality of motors may have the same operating state.

In some embodiments, the one or more processors may be further configured to, individually or collectively, detect an acceleration of the at least one motor. The at least one motor may have an operating state that is the decelerating state when the acceleration of the at least one motor is negative. In some instances, the power from the at least one motor may comprise an electrical current generated by a back electromotive force of the at least one motor.

In some embodiments, the one or more processors may be configured to, individually or collectively, determine whether a back electromotive force of the at least one motor is higher than a voltage applied on the at least one motor. The at least one motor may have an operating state that is the decelerating state when the back electromotive force of the at least one motor is higher than a voltage applied on the motor. In some instances, the power from the at least one motor may comprise an electrical current generated by a back electromotive force of the at least one motor.

In some embodiments, the one or more processors may be configured to, individually or collectively, determine if a q-axis current of the at least one motor is negative. The at least one motor may have an operating state that is the decelerating state when the q-axis current of the at least one motor is negative. In some instances, the power from the at least one motor may comprise an electrical current generated by a back electromotive force of the at least one motor.

In some embodiments, redistributing power from the at least one motor may be conducted using a field orientation control (FOC) method. The FOC method may comprise determining a position of the corresponding rotor.

A method of redistributing motor power of a movable object such as an unmanned aerial vehicle (UAV) may be provided in accordance with another aspect of the disclosure. The method may comprise: determining, with aid of one or more processors, an operating state of at least one motor of UAV, wherein the at least one motor is used to drive a corresponding rotor that generates lift for the UAV during flight of the UAV; determining, with aid of the one or more processors how to redistribute power from the at least one motor between a plurality of components when the at least one motor has an operating state that is a decelerating; and redistributing the power in accordance with the determination of how to redistribute the power.

In some embodiments, determining how to redistribute power may include determining an apportionment of the power between the plurality of components. In some instances, the apportionment of the power may include at least one component of the plurality of components not receiving any of the power. Alternatively, the apportionment of the power between the plurality of components may be unequal.

In some embodiments, the plurality of components may comprise a plurality of other motors of the UAV, each configured to drive a corresponding rotor that is configured to generate for the UAV during flight of the UAV. In some embodiments, the plurality of components may comprise at least one motor of the UAV configured to drive a corresponding rotor that is configured to generate for the UAV during flight of the UAV and at least one battery configured to store energy. In some instances, the battery may be configured to provide energy to the at least one motor when the at least one motor is in an accelerating state.

In some embodiments, determining how to redistribute power may include assessing an amount of power consumption of the at least one of the plurality of components.

In some embodiments, the method may further comprise remotely controlling the flight of the UAV with aid of a remote terminal while receiving power from the at least one motor.

In some embodiments, the corresponding rotor may generate lift for the UAV while redistributing power from the at least one motor takes place. The rotors driven by other motors may generate lift for the UAV while redistributing power from the at least one motor takes place.

In some embodiments, redistributing power from the at least one motor may comprise converting the kinetic energy from the motor motion to electrical energy. In some instances, the decelerating of the at least one motor may be initiated in response to a signal to cause braking of the at least one motor.

In some embodiments, the method may further comprise determining an operating state of each motor of said plurality. In some instances, the plurality of motors may have different operating states. Alternatively, the plurality of motors may have the same operating state.

In some embodiments, the method may further comprise detecting an acceleration of the at least one motor. The at least one motor may have an operating state that is the decelerating state when the acceleration of the at least one motor is negative. In some instances, redistributing power from the at least one motor may comprise redistributing an electrical current generated by a back electromotive force of the at least one motor.

In some embodiments, the method may further comprise determining whether a back electromotive force of the at least one motor is higher than a voltage applied on the at least one motor. The at least one motor may have an operating state that is the decelerating state when the back electromotive force of the at least one motor is higher than a voltage applied on the motor. In some instances, redistributing power from the at least one motor may comprise redistributing an electrical current generated by a back electromotive force of the at least one motor.

In some embodiments, the method may further comprise determining if a q-axis current of the at least one motor is negative. The at least one motor may have an operating state that is the decelerating state when the q-axis current of the at least one motor is negative. In some instances, redistributing power from the at least one motor may comprise redistributing an electrical current generated by a back electromotive force of the at least one motor.

In some embodiments, redistributing the power may include supplying the power to one or more motors that are not in a decelerating state. In some instances, supplying the power may include supplying excess power that is not supplied to the one or more motors to the at least one battery. The battery may be connected in parallel with the at least one motor through a power bus.

In some embodiments, redistributing the power from the at least one motor may be conducted using a field orientation control (FOC) method. The FOC method comprises determining a position of the corresponding rotor.

A system for redistributing motor power of a movable object such as an unmanned aerial vehicle (UAV) may be provided in accordance with another aspect of the disclosure. The system may comprise: at least one motor of a UAV configured to drive a corresponding rotor that is configured to generate lift for the UAV during flight of the UAV; one or more processors configured to, individually or collectively, (1) determine an operating state of the at least one motor of UAV, and (2) determine how to redistribute power from the at least one motor between a plurality of components when the at least one motor has an operating state that is a decelerating; at least one energy distribution unit configured to redistribute power in accordance with the determination of how to redistribute the power.

In some embodiments, the determination of how to redistribute power may include an apportionment of the power between the plurality of components. In some instances, the apportionment of the power may include at least one component of the plurality of components not receiving any of the power. Alternatively, the apportionment of the power between the plurality of components may be unequal.

In some embodiments, plurality of components may comprise a plurality of other motors of the UAV, each configured to drive a corresponding rotor that is configured to generate for the UAV during flight of the UAV. In some embodiments, the plurality of components may comprise at least one motor of the UAV configured to drive a corresponding rotor that is configured to generate for the UAV during flight of the UAV and at least one battery configured to store energy. The battery may be configured to provide energy to the at least one motor when the at least one motor is in an accelerating state.

In some embodiments, the determination of how to redistribute power may include an assessment on an amount of power consumption of the at least one of the plurality of components.

In some embodiments, the system may further comprise a remote terminal configured to remotely control the flight of the UAV while redistributing power from the at least one motor.

In some embodiments, the corresponding rotor may generate lift for the UAV while redistributing power from the at least one motor takes place. The rotors driven by other motors may generate lift for the UAV while redistributing power from the at least one motor takes place.

In some embodiments, redistributing power from the at least one motor may comprise converting the kinetic energy from the motor motion to electrical energy. In some instances, the decelerating of the at least one motor may be initiated in response to a signal to cause braking of the at least one motor.

In some embodiments, the UAV may comprise a plurality of motors, each configured to drive a corresponding rotor that is configured to generate lift for the UAV during flight of the UAV. The one or more processors are further configured to, individually or collectively, determine an operating state of each motor of said plurality. In some instances, the plurality of motors may have different operating states. Alternatively, the plurality of motors may have the same operating state.

In some embodiments, the one or more processors may be further configured to, individually or collectively, detect an acceleration of the at least one motor. The at least one motor may have an operating state that is the decelerating state when the acceleration of the at least one motor is negative. In some instances, the power from the at least one motor may comprise an electrical current generated by a back electromotive force of the at least one motor.

In some embodiments, the one or more processors may be configured to, individually or collectively, determine whether a back electromotive force of the at least one motor is higher than a voltage applied on the at least one motor. The at least one motor may have an operating state that is the decelerating state when the back electromotive force of the at least one motor is higher than a voltage applied on the motor. In some instances, the power from the at least one motor may comprise an electrical current generated by a back electromotive force of the at least one motor.

In some embodiments, the one or more processors may be configured to, individually or collectively, determine if a q-axis current of the at least one motor is negative. The at least one motor may have an operating state that is the decelerating state when the q-axis current of the at least one motor is negative. In some instances, the power from the at least one motor may comprise an electrical current generated by a back electromotive force of the at least one motor.

In some embodiments, redistributing the power may include supplying the power to one or more motors that are not in a decelerating state. In some instances, supplying the power may include supplying excess power that is not supplied to the one or more motors to the at least one battery. The battery may be connected in parallel with the at least one motor through a power bus.

In some embodiments, redistributing the power may be conducted using a field orientation control (FOC) method. The FOC method may comprise determining a position of the corresponding rotor.

An electronic speed controller for recycling motor power of a movable object such as an unmanned aerial vehicle (UAV) may be provided in accordance with another aspect of the disclosure. The electronic speed controller may comprise an output circuit configured to control a current to at least one motor of the UAV, wherein the at least one motor is used to drive a corresponding rotor that generates lift for the UAV during flight of the UAV; and one or more processors configured to, individually or collectively, (1) determine an operating state of the at least one motor of UAV, and (2) recycle power from the at least one motor when the at least one motor has an operating state that is a decelerating state while the UAV is in flight during which one or more rotors generate lift for the UAV.

In some embodiments, the corresponding rotor may generate lift for the UAV while recycling power from the at least one motor takes place. Recycling power from the at least one motor may comprise converting the kinetic energy from the motor motion to electrical energy. Decelerating state of the at least one motor may be initiated in response to a signal to cause braking of the at least one motor.

In some embodiments, the UAV may comprise a plurality of motors, each configured to drive a corresponding rotor that is configured to generate lift for the UAV during flight of the UAV. The one or more processors may be further configured to, individually or collectively, determine an operating state of each motor of said plurality. In some instances, the plurality of motors may have different operating states. Alternatively, the plurality of motors may have the same operating state.

In some embodiments, determining an operating state of the at least one motor may comprise detecting an acceleration of the at least one motor. The at least one motor may have an operating state that is the decelerating state when the acceleration of the at least one motor is negative. Recycling power from the at least one motor may comprise recycling an electrical current generated by a back electromotive force of the at least one motor.

In some embodiments, determining an operating state of the at least one motor may comprise determining whether a back electromotive force of the at least one motor is higher than a voltage applied on the at least one motor. The at least one motor may have an operating state that is the decelerating state when the back electromotive force of the at least one motor is higher than a voltage applied on the motor. Recycling power from the at least one motor may comprise recycling an electrical current generated by a back electromotive force of the at least one motor.

In some embodiments, determining an operating state of the at least one motor may comprise determining if a q-axis current of the at least one motor is negative. The at least one motor may have an operating state that is the decelerating state when the q-axis current of the at least one motor is negative. Recycling power from the at least one motor may comprise recycling an electrical current generated by a back electromotive force of the at least one motor.

In some embodiments, the one or more processors may be further configured to, individually or collectively, supply the recycled power to one or more motors that are not in a decelerating state. In some instances, the one or more processors may be further configured to, individually or collectively, supply excess power that is not supplied to the one or more motors to a battery. The battery may be connected in parallel with the at least one motor through a power bus. Alternatively, the one or more processors may be further configured to, individually or collectively, supply the recycled power is supplied to a battery.

In some embodiments, recycling power from the at least one motor may be conducted using a field orientation control (FOC) method. The FOC method may comprise determining a position of the corresponding rotor.

An electronic speed controller for recycling motor power of a movable object such as an unmanned aerial vehicle (UAV) may be provided in accordance with another aspect of the disclosure. The electronic speed controller may comprise an output circuit configured to control a current to at least one motor of the UAV, wherein the at least one motor is used to drive a corresponding rotor that generates lift for the UAV during flight of the UAV; and one or more processors configured to, individually or collectively, (1) determine an operating state of the at least one motor of UAV, (2) determine how to redistribute power from the at least one motor between a plurality of components when the at least one motor has an operating state that is a decelerating; and (3) redistribute the power in accordance with the determination of how to redistribute the power.

In some embodiments, determining how to redistribute power may include determining an apportionment of the power between the plurality of components. In some instances, the apportionment of the power may include at least one component of the plurality of components not receiving any of the power. Alternatively, the apportionment of the power between the plurality of components may be unequal. Alternatively, determining how to redistribute power may include assessing an amount of power consumption of the at least one of the plurality of components.

In some embodiments, the plurality of components may comprise a plurality of other motors of the UAV, each configured to drive a corresponding rotor that is configured to generate for the UAV during flight of the UAV. Alternatively, the plurality of components may comprise at least one motor of the UAV configured to drive a corresponding rotor that is configured to generate for the UAV during flight of the UAV and at least one battery configured to store energy. The battery may be configured to provide energy to the at least one motor when the at least one motor is in an accelerating state.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

The methods and systems described herein provide an effective approach to increase the energy efficiency and increase a battery life of a movable object such as an unmanned aerial vehicle (UAV) by recycling motor power of the UAV. The UAV may be a multi-rotor UAV comprising one or more motors that may each drive one or more rotors that effect flight of the UAV. In some instances, a UAV may continuously vary a speed of the one or more motors, which drive the rotor blades to generate lift for the UAV during the flight, to implement various flight control, e.g., accelerating, decelerating, climbing, descending, rolling, rotating, tumbling, etc. For example, the power of at least one motor may be increased in an accelerating state to output more energy, and may be decreased in a subsequent decelerating state. During the decelerating state, it may be desirable to collect the motor power previously generated in the accelerating state, rather than consuming it by damping of blades. The kinetic energy from the motors that have been accelerated may be captured for increased energy efficiency when the motors are decelerating.

The methods and system of present disclosure may determine an operating state of at least one motor of the UAV while the UAV is in flight, and recycle power generated by the kinetic energy from the at least one motor when the at least one motor has a decelerating state. The recycled power from the at least one motor may include an electrical current generated by a back electromotive force (BEMF) of the motor.

The recycled motor power may be directly redistributed to other power consuming components, e.g., other motors in an accelerating state or sensors onboard the UAV, via a power bus, while any remaining power after the other power consuming components may be supplied to a battery. Alternatively, a determination may be made on how to redistribute the recycled power between a plurality of power consuming components and/or the battery, and the recycled power may be redistributed in accordance with the determination.

Figure 1:
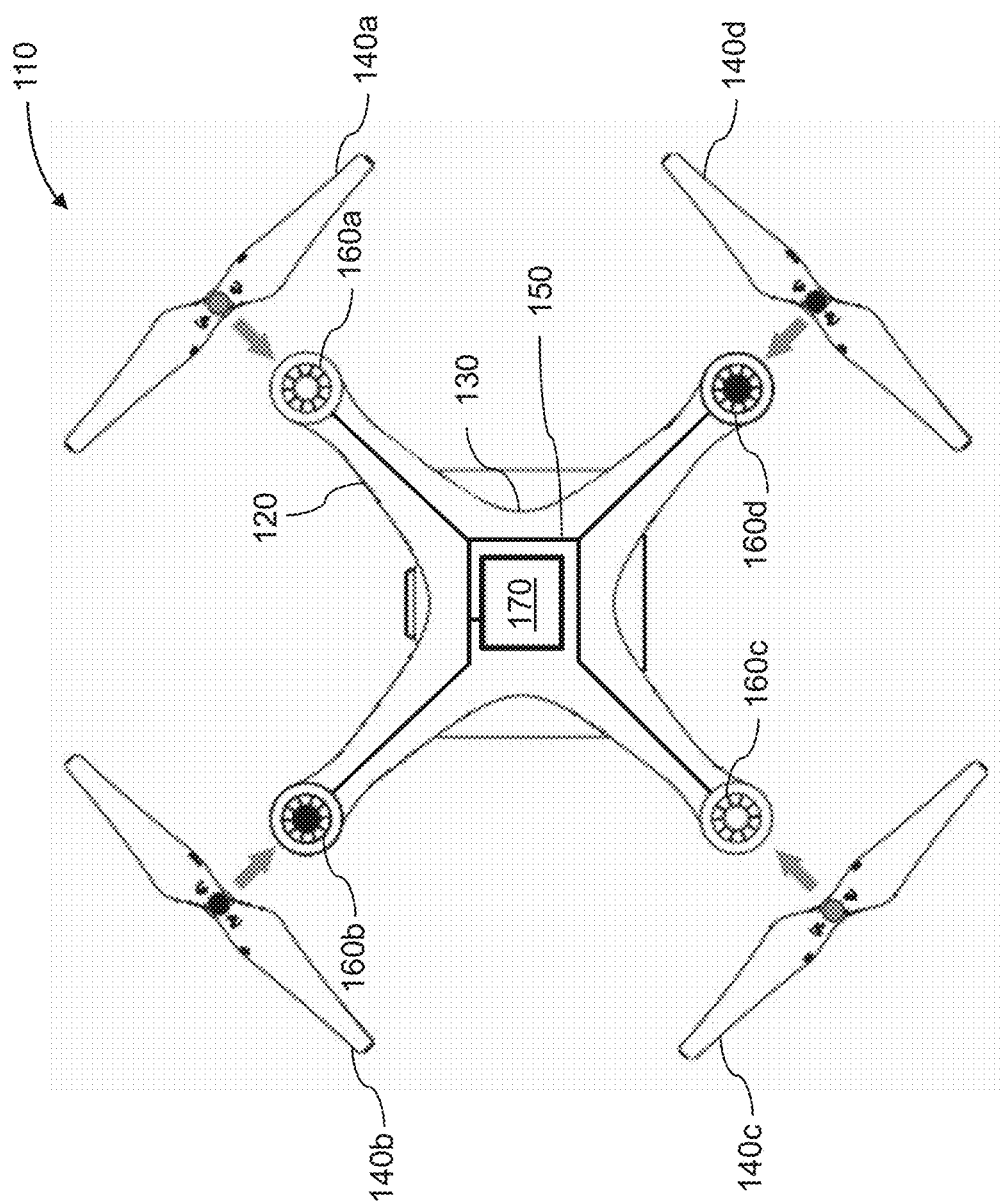
FIG. 1 shows a schematic of an unmanned aerial vehicle (UAV) in accordance with an embodiment of the disclosure.

FIG. 1 shows a schematic of a UAV 110 in accordance with an embodiment of the disclosure. The UAV may include a central body 130 with one or more arms 120 branching from the body. One or more rotors 140a-140d may be supported by the arms. The rotors may each be respectively driven by motors 160a-160d. The motors may be connected to one another via a power bus 150. In some embodiments, an energy storage device 170 such as a battery may also be connected to the power bus 150.

Any description herein of a UAV 210 may apply to any type of movable object, such as an aerial vehicle. The description of a UAV may apply to any type of unmanned movable object (e.g., which may traverse the air, land, water, or space).

Further examples and descriptions of the UAV 110 are provided in greater detail below. In some embodiments, the central body 130 may have a cavity within which one or more components may be provided. The arms 120 may also have one or more cavities within which one or more components may be provided. The UAV may have a housing having an exterior surface and an interior surface. The interior surface of the housing may define an interior space within which one or more components may be provided. Alternatively or in addition, components may be provided on an exterior of the UAV housing. The UAV housing may include the central body and one or more arms.

Motors 160a-160d that may be used to drive the rotors 140a-140d may be provided anywhere along the length of the arm 120. In some instances, the motors may be provided at or near a distal end of the arms. The proximal ends of the arms may be connected to or adjoined with the central body. The motors may be provided in an interior portion of the UAV, exterior to a housing of a UAV, or may be partially within and outside a housing of the UAV. The motors may be electrically connected to a power bus 150. The motors may be electrically connected via one or more connecting hardware components (e.g., wires, bars, etc.). The connecting hardware components and/or the power bus may be within the interior of the UAV. The motors may be electrically connected to one another in parallel. The motors may be electrically connected to one another in parallel via the power bus.

An energy storage unit 170 such as one or more batteries may be provided on-board the UAV. The energy storage unit may be provided within an interior of the UAV. The energy storage unit may or may not be removable from the UAV and/or exchanged for other energy storage units. The energy storage unit may be electrically connected to a power bus 150. The energy storage unit may be electrically connected via one or more hardware components (e.g., wires, bars, etc.). The energy storage unit may provide power to the one or more motors 160a-160d via the power bus in order to effect actuation of the motors. When the motors are accelerating, they may be receiving power from the energy storage unit.

If one or more motors 160a-160d is decelerating, the systems and methods provided herein may permit recapture of the kinetic energy of the decelerating motor. The recaptured energy when dampening of the motor occurs may be provided by the motor to the system described herein. Power from a decelerating motor 160a may be provided to the power bus 150. The power from the decelerating motor may be provided to another motor that requires power 160b. The other motor that requires power may be in an accelerating state or maintaining its speed. Power from the decelerating motor may be transferred with aid of the power bus to the other motor. In some embodiments, power from the decelerating motor may be provided to an energy storage unit 170. Power from the decelerating motor may be transferred with aid of the power bus to the energy storage unit. The power from the decelerating motor may be used to increase a state of charge of a battery on-board the UAV. This may permit the battery to convey the power to the decelerating motor or any other motor at a later time. In some embodiments, the power from the decelerating motor may be transferred to a plurality of power-consuming components (e.g., one or more other motors 160b-160d, sensors, lights, communication units, navigation modules, etc.) which will be described in greater detail elsewhere herein. Optionally, the power from the decelerating motor may also be transferred to an energy storage unit in combination with one or more power-consuming components.

In some alternative implementations, each motor 160a-160d may be individually and/or directly connected to an energy storage unit 170. Multiple motors may be electrically connected to the same energy storage unit or may be electrically connected to different energy storage unit. Power from a decelerating motor 160a may be transferred to the energy storage unit. The energy storage unit may be used to provide energy to the motor 160a when it is no longer decelerating and/or any other motors 160b-160d or power consuming components. Thus, kinetic energy from a decelerating motor may be recaptured and used with or without use of the power bus 150.

In some embodiments, a flight controller may be in communication with one or more motors. The flight controller may send commands to the motors that may effect and/or control actuation of the motors. The flight controller may be within a housing of the UAV. The flight controller or any other type of processing component may be used to determine an operational state of the motor. In some instances, each motor may have an associated electronic speed control (ESC) that may aid in controlling operation of the motor. Optionally, the ESC or other components may aid in determining an operational state of the motor. The flight controller and the processing components are described in greater detail elsewhere herein.

Figure 2:
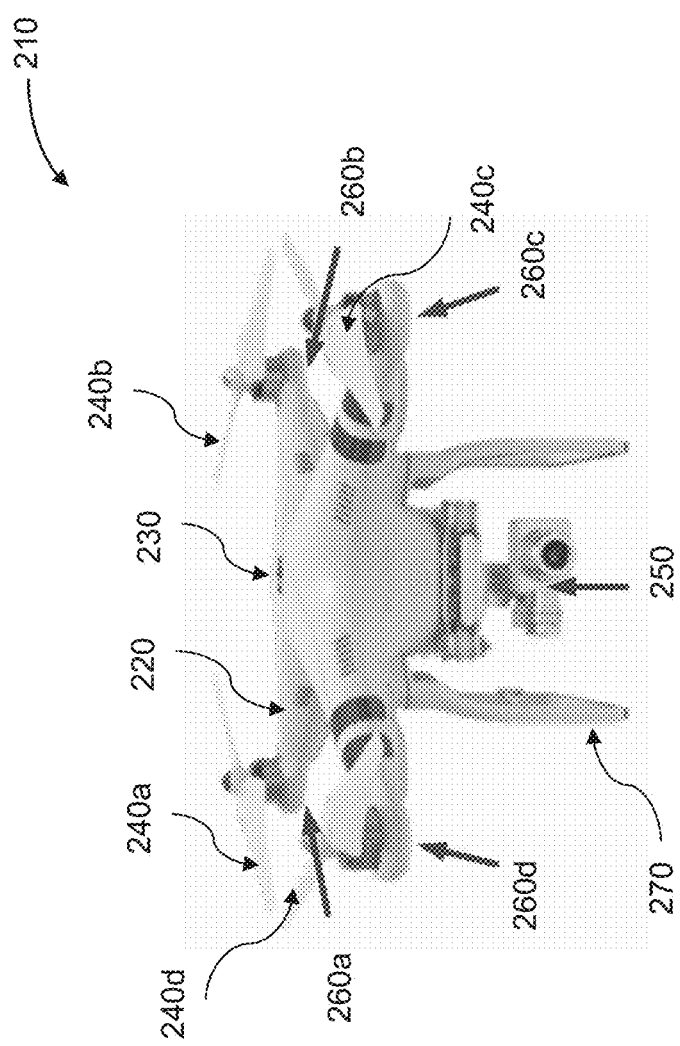
FIG. 2 shows an example of an exterior view of a UAV in accordance with an embodiment of the disclosure.

FIG. 2 shows an exterior perspective view of an example of a UAV 210 in accordance with an embodiment of the disclosure. The UAV 210 of this embodiment may have a body 230 and a plurality of arms 220 which extend outward from the body 230 of UAV in a radial manner. A plurality of rotors 240a-240d may be respectively disposed at the distal ends of the arms 220. The plurality of rotors 240a-240d may be respectively driven by motors 260a-260d. The UAV 210 may carry various payloads 250 including but not limited to carriers, cameras, and sensors. In some embodiments, one or more extensions members, such as landing stands 270, may extend from the UAV.

In some instances, the body 230 may be a central body which may have one or more branching members 220, or "arms." The arms may extend outward from the body in a radial manner and be joined via the body. In some embodiments, each arm may have a propulsion unit on the arm. Alternatively, one or more arms may not have a propulsion unit on the arm. Any number of arms may be provided, such as one, two, three, four, five, six, seven, eight, nine, ten, or more arms. The body 230 of the UAV may comprise a housing. The housing may enclose one or more components of the UAV within the housing. In some instances, one or more electrical components of the UAV may be provided within the housing. For example, a flight controller of the UAV may be provided within the housing. The flight controller may control operation of one or more propulsion units of the UAV.

In the embodiment of FIG. 2, the UAV 210 may comprise four rotors 240a-240d (a.k.a. propellers) which can be disposed at distal ends of the four arms 220. The four arms 220 may extend outward from the body 230 of UAV in a radial manner. The four arms and four rotors/propellers in this embodiment are only exemplary. In other embodiments, any number of arms may be employed, as long as the number of arms matching the number of propulsion units, or rotors/propellers, of the UAV. The number of arms may be one, two, three, four, five, six, seven, eight, nine, ten, or more.

A propulsion unit of the UAV 210 may generally comprise a rotor and a motor. The rotors which may include rotor blades, can be respectively driven by the motor. The rotors 240 may rotate and generate lift for the UAV 210. The motors 260a-260d may be driven by a battery or battery assembly installed inside or outside of the body 230 of UAV 210. In some instances, the plurality of motors 260a-260d may be individually connected to the battery or battery assembly through electrical paths. Alternatively, the plurality of motors 260a-260d may be connected to the battery or battery assembly via a power bus, thus the electrical power may be fed to the plurality of motors 260a-260d via the power bus.

The UAV 210 may be a rotorcraft. In some instances, the UAV 210 may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation being parallel to one another. In some instances, the rotors may have axes of rotation that are at any angle relative to one another, which may affect the motion of the UAV. The rotation of the rotors may be driven by one or more motors coupled to the rotors.

In some embodiments, the payloads 250 may be carried on the central body of the UAV. In other embodiments, the payloads 250 may be disposed on the arms of the UAV, a landing stand of the UAV, or any other portion of the UAV.

The UAV 210 may be an aerial vehicle. The UAV 210 may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another. The flight of the UAV may be controlled by real-time instructions received from a remote terminal and/or pre-set programs stored in a memory onboard the UAV. For example, a height, posture, speed, acceleration and direction of the UAV may be controlled throughout the course of the UAV's flight, according to various flight schemes. In order to implement various flight actions, including but not limited to, rotating about one or more axes, tumbling, moving upwards or moving downwards, the one or more propulsion units may output various and constantly changing power level by accelerating and/or decelerating the motors.

The UAV 210 may be of small dimensions. The UAV may be capable of being lifted and/or carried by a human. The UAV may be capable of being carried by a human in one hand.

The UAV 210 may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV 210 may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

A battery or battery assembly may be coupled to the UAV 210. The battery assembly may include one or more batteries. The batteries may optionally be connected in series, in parallel, or any combination thereof, with one another. The battery or battery assembly may be coupled to a UAV to provide power to one or more components of the UAV. The battery or battery assembly may provide power to electrical components including one or more propulsion units, flight controller, sensor (e.g., inertial measurement unit or any other sensors described elsewhere herein), communication unit, navigational units, emitters (e.g., lights, audio), and/or any other component of the UAV while coupled to the UAV. The electrical components may be power consuming components. The electrical components may consume electrical energy during operation.

The electrical components may be electrically connected to the battery or battery assembly via individual electrical paths. Alternatively, the electrical components may be electrically connected to the battery or battery assembly via a power bus. The battery or battery assembly may provide power to the electrical components through individual electrical paths. Alternatively, the battery or battery assembly may provide power to the electrical components through the power bus.

The UAV may be capable of responding to commands from a remote controller. The remote controller may be not connected to the UAV. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously.

The operation of the motors may be collectively or individually controlled by one or more controllers. In some instances, the plurality of motors in a multi-rotor UAV may output same power. In other instances, the plurality of motors in a multi-rotor UAV may output different power. In some embodiments, the speed of a motor may continuously vary according to a signal from a remote controller of the UAV. Alternatively, the speed of the motor may be varied and/or be maintained according to a flight control signal generated autonomously or semi-autonomously on-board or off-board the UAV. In order to implement various flight modes, e.g., accelerating, decelerating, climbing, descending, rolling, rotating, tumbling, etc., the plurality of motors 260a-260d of the UAV 210 may output different power, such that the rotors may rotate at varying rates, which may generate different amounts of lift or thrust.

The UAV 210 may need to implement various flight modes (e.g., accelerating, decelerating, climbing, descending, rolling, rotating, tumbling, etc.) during the flight, thus the output power of one or more motors may continuously vary. For instance, the UAV may control to increase the power output of one or more motors when the UAV is in an accelerating state or climbing state. For another instance, the UAV may control to decrease the power output of one or more motors when the UAV is in a decelerating state or descending state. For another instance, one or more motors of the UAV may increase the output power while other motors may decrease the output power when the UAV is in a rotating state. The power output to the motor may also be held steady as desired.

In the embodiment of FIG. 2, a four-rotor UAV 210 provided with four motors 260a-260d is shown as an example. In some instances, all the four motors may be in a decelerating state. In some instances, one motor may be in an accelerating state while the other three motors may be in a decelerating state. In some instances, two motor may be in an accelerating state while the other two motors may be in a decelerating state. In some instances, three motors may be in an accelerating state while the other one motor may be in a decelerating state. In other instances, all the four motors may be in an accelerating state.

In one example, motors 260a and 260b may be in a decelerating state while motor 260c and 260d may be in an accelerating state. In another example, motors 260a and 260b may be in an accelerating state while motors 260c and 260d may be in a decelerating state. In another example, motors 260a and 260c may be in an accelerating state while motors 260b and 260d may be in a decelerating state. In another example, motors 260a and 260c may be in a decelerating state while motors 260b and 260d may be in an accelerating state. In another example, motors 260a, 260b and 260c may be in an accelerating state while motor 260d may be in an accelerating state. In still another example, all the motors 260a-260d may be in a decelerating state. In yet another example, all the motors 260a-260d may be in an accelerating state.

The accelerating and decelerating of a motor may be controlled by a level of power supplied thereto. The level of power supplied to each motor may be controlled and adjusted by one or more flight controllers onboard or off-board the UAV, according to real-time instructions received from a remote terminal and/or pre-set programs stored in a memory onboard the UAV. Here, the level of power may include, but not limited to, a voltage to be applied on the motor, a current to be supplied to the motor, or Watts to be fed to the motor.

The motor may be a device which converts electricity into a mechanical motion. The motor may be a AC motor, which is an electric motor driven by alternating current, or a DC motor, which is an electric motor that runs on direct current electricity. The AC motor may include a synchronous motor and an induction motor. The DC motor may include a brushed motor and a brushless motor. The motor 260a-260d as used here in the embodiment may be DC motors driven by the power fed from the battery or battery assembly, individually or through a power bus, as discussed herein above.

In a motor using a rotating armature in the presence of a magnetic flux, the conductors may cut the magnetic field lines as they rotate. This may produce a voltage in the coil, which is called "back electromotive force" (BEMF) or counter electromotive force. The motor may be acting like a generator according to Faraday's law of induction; at the same time, it is a motor. This voltage may oppose the original applied voltage; therefore, it is called "back electromotive force" (BEMF) or "counter-electromotive force", by Lenz's law. During the operation of a motor, the BEMF (i.e., a voltage) may occur in electric motors where there is relative motion between the armature of the motor and the magnetic field from the motor's field magnets, or windings. From Faraday's law, the voltage may be proportional to the magnetic field, length of wire in the armature, and the speed of the motor.

When the rotating speed of a motor is decreasing, e.g., the motor is in a decelerating state, the generated back electromotive force may be higher than the original voltage applied in the motor; meanwhile, a current may be generated and fed back to the power line of the motor. The generated current may be collected, thus the power from the motor in a decelerating state may be recovered. The decreasing of rotating speed of a motor, i.e., the occurrence of decelerating state, may due to a braking signal received from a remote terminal, for example, a remote controller of the UAV.

The motor power recovering of present disclosure may be executed when at least one motor of the UAV is determined as in a decelerating state, not necessarily when all the motors are in a decelerating state. For example, in the embodiment of FIG. 2, when the UAV 210 is performing a rotating flight by controlling motors 260a and 260b in a decelerating state while motor 260c and 260d in an accelerating state, the back electromotive force generated on motors 260a and 260b may be higher than the original voltage applied, and a current may be generated on power lines of motors 260a and 260b. The generated current may be collected and re-used, which means the power from motors 260a and 260b in a decelerating state is recovered. The process of recovering motor power by converting the kinetic energy from the motor motion to electrical energy may be implemented by a FOC (Field Orientated Control) method. The FOC method may be implemented by one or more processors. The one or more processors may be onboard or off-board the UAV.

In some embodiments, the recovered power from one or more motors in a decelerating state may be redistributed from the one or more motors to a power consuming component of the UAV. The power consuming component may include, but not limited to, motors in an accelerating state, flight controllers, or sensors onboard the UAV. For example, in the embodiment of FIG. 2, when the UAV 210 is performing a rotating flight by controlling motors 260a and 260b in a decelerating state while motors 260c and 260d in an accelerating state, a current may be generated on power lines of motors 260a and 260b which are determined as in a decelerating state. The recovered power may be directly redistributed from motors 260a and 260b, which are in a decelerating state, to motors 260c and 260d in an accelerating state as well as other electrical components such as sensors onboard the UAV 210.

If excess power remains after distributing the power to motors 260 and 260d in an accelerating state as well as other electrical components such as sensors, the excess power may be redistributed from the motors 260a and 260b in a decelerating state to a battery or battery assembly onboard the UAV.

In some embodiments, the recovered power from one or more motors in a decelerating state may be redistributed in accordance with a determination on how to redistributing the power between a plurality of power consuming components of the UAV. For example, in the embodiment of FIG. 2, when the UAV 210 is performing a rotating flight by controlling motors 260a and 260b in a decelerating state while motors 260c and 260d in an accelerating state, a current may be generated on power lines of motors 260a and 260b which are determined as in a decelerating state. At this moment, a determination may be made on how to redistributing the recovered power between motors 260 and 260d in an accelerating state as well as other electrical components such as sensors onboard the UAV 210, by one or more processors onboard or off-board the UAV.

In some embodiments, the recovered power from one or more motors in a decelerating state may be redistributed in accordance with a pre-set program. The pre-set program may be stored in memory units (e.g., removable media or external storage such as an SD card or random access memory (RAM)) onboard the UAV. In other embodiment, the recovered power from one or more motors in a decelerating state may be redistributed from the one or more motors directly to the battery or battery assembly onboard the UAV.

Figure 3:
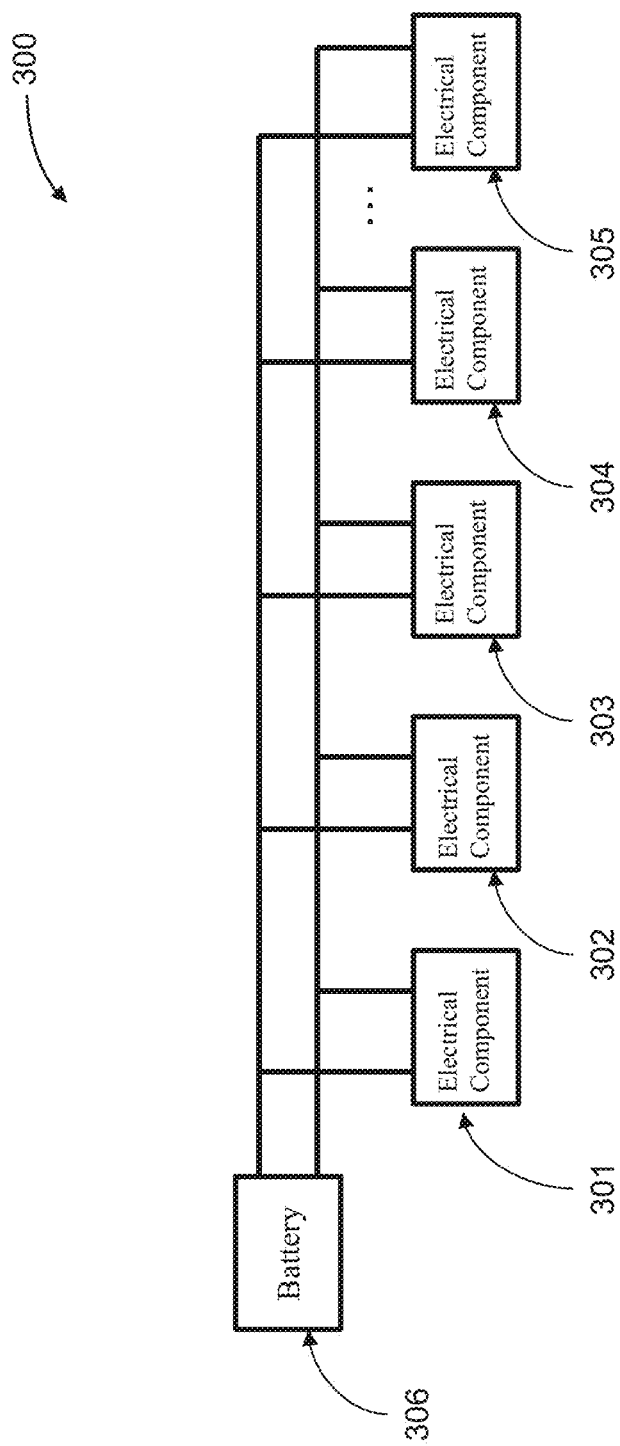
FIG. 3 shows an example of a power bus configuration of UAV, in accordance with an embodiment of the disclosure.

FIG. 3 shows an example of a power bus configuration 300 of UAV, in accordance with an embodiment of the disclosure. In the example of FIG. 3, a plurality of electrical components 301-305 are electrically connected to a battery 306 via a power bus.

The power bus as used herein may be any type of suitable of power bus known in the art. In some embodiments, the power bus may include, but not limited to, an electrically connection line, or a wire harness.

In some embodiments, the power bus may be a direct current (DC) power bus. The power bus may be in electrical connection/communication with the electrical components 301-305. The power bus may function to supply the power of the battery 306 to the electrical components 301-305. Meanwhile, the power bus may also function to feed the recycled power from the one or more motors in a decelerating state to other electrical components or to the battery 306. The electrical components and/or the battery may be distributed on-board the UAV. For instance, one or more components and/or the battery may be within an interior of the UAV, on an exterior portion of the UAV or embedded within a housing of the UAV. The electrical components and/or the battery may be within a central body of the UAV and/or one or more branching arms of the UAV. The electrical components may be electrically connected to one another as described.

The recycled power from at least one motor in a decelerating state may be stored in the battery 206, for example, by charging the battery 306. The battery 306 may be any type of suitable battery which is adapted to be mounted on the UAV, supply power to one or more electrical components of the UAV and store the recycled power. The battery 306 may be a rechargeable battery or a secondary battery of Lead-acid, Alkaline, Nickel-iron, Nickel-cadmium, Nickel-hydrogen. Nickel-metal hydride, Nickel-zinc, Lithium-air (organic). Lithium Cobalt Oxide, Lithium-ion polymer, Lithium iron phosphate, Lithium sulfur, Lithium-titanate, Sodium-ion, Thin film lithium, Zinc-bromide, Zinc-cerium, Vanadium redox, Sodium-sulfur, Molten salt, Silver-oxide, or Quantum Battery (oxide semiconductor).

The battery 306 may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the battery 306 may be greater than or equal to any of the values described herein. The battery 306 may have a greatest dimension falling within a range between any two of the values described herein.

The battery 306 may provide a voltage on electrical components onboard the UAV. In some instances, The battery 306 may provide a voltage more than or equal to 0.01 V, 0.02 V, 0.04 V, 0.06 V, 0.08 V, 0.1 V, 0.2 V, 0.4 V, 0.6 V, 0.8 V, 1.0 V, 1.2 V, 1.4 V, 1.6 V, 1.8 V, 2.0 V, 2.2 V, 2.4 V, 2.6 V, 2.8 V, 3.0 V, 3.2 V, 3.4 V, 3.6 V, 3.8 V, 4.0 V, 4.2 V, 4.4 V, 4.6 V, 4.8 V, 5.0 V, 5.5 V, 6.0 V, 6.5 V, 7.0 V, 7.5 V, 8.0 V, 8.5 V, 9.0 V, 9.5 V, 10 V, 15 V, 20 V, 25 V, 30 V, 40 V, or 50 V. Optionally, the output voltage of the battery 306 may be greater than or equal to any of the values described herein. The output voltage of the battery 306 may have a greatest value falling within a range between any two of the values described herein.

The battery 306 may have a capacity more than or equal to 10 mAh, 50 mAh, 100 mAh, 200 mAh, 400 mAh, 600 mAh, 800 mAh, 1,000 mAh, 1,200 mAh, 1,400 mAh, 1,600 mAh, 1,800 mAh, 2,000 mAh, 2,200 mAh, 2.400 mAh, 2,600 mAh, 2,800 mAh, 3,000 mAh, 3,500 mAh, 4,000 mAh, 4,500 mAh, 5,000 mAh, 6,000 mAh, 7,000 mAh, 8,000 mAh, 9.000 mAh, 10.000 mAh, or 20,000 mAh. Optionally, the capacity of the battery 306 may be greater than or equal to any of the values described herein. The capacity of the battery 306 may have a greatest value falling within a range between any two of the values described herein.

The battery 306 may have a charge cycles more than or equal to 50, 100, 200, 300, 400, 500, 600, 700, 800, 900, 1,000, 1,200, 1,400, 1,600, 1,800, 2,000, 2,200, 2,400, 2,600, 2,800, 3,000, 3,400, 3,800, 4,000, 4,500, 5,000, 6,000, 7,000, 8,000, 10,000, 20,000, 30,000, 40,000, 50,000, 60,000, 70,000, 80,000, 90,000 or 100,000. Optionally, the charge cycles of the battery 306 may be greater than or equal to any of the values described herein. The charge cycles of the battery 306 may have a greatest value falling within a range between any two of the values described herein.

In some embodiments, the power to be fed to the plurality of electrical components 301-305 may be supplied from a battery assembly. In some instances, the battery assembly may be a stack of batteries onboard the UAV. Alternatively, the battery assembly may be a plurality of batteries which are disposed onboard the UAV in a distributed manner and connected by the power bus. Any description herein of a battery 306 may apply to a battery assembly.

The electrical components 301-305 may be components to be driven by the power of battery 306. The electrical components 301-305 may be electrically connected to the power bus in a parallel manner, enabling each one of the electrical components receive power from the battery 306. The electrical components 301-305 may include, but not limited to, one or more motors, flight controller, camera, sensor, inertial measurement unit, communication unit, and/or any other component of the UAV. Examples of sensors of the UAV may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones), or field sensors (e.g., magnetometers, electromagnetic sensors).

With the configuration shown in FIG. 3, the recycled power from the at least motor in a decelerating state may be supplied to other power consuming components or a battery. For example, the UAV in the embodiment of FIG. 3 may be a four-rotor UAV with four motors 301-304 and a camera 305 as the electrical components. When the UAV is performing a rotating flight by controlling motors 301 and 302 in a decelerating state while motors 303 and 304 in an accelerating state, a current may be generated by motors 301 and 302 which are determined as in a decelerating state. In some embodiments, the generated current may be fed to the power bus, and then supplied to the motors 303 and 304 in an accelerating state and camera 305 through the power bus. If excess current remains after distributing the power to motors 303 and 304 and camera 305, the excess current may be redistributed from the motors 301 and 302 to the battery 306. In some embodiments, the generated current may be fed to the power bus, and then supplied to the motors 303 and 304 or battery 306 in accordance with a determination or a pre-set program. In other embodiments, the generated current may be fed to the power bus, and then supplied to battery 306, as discussed herein above.

Figure 4:
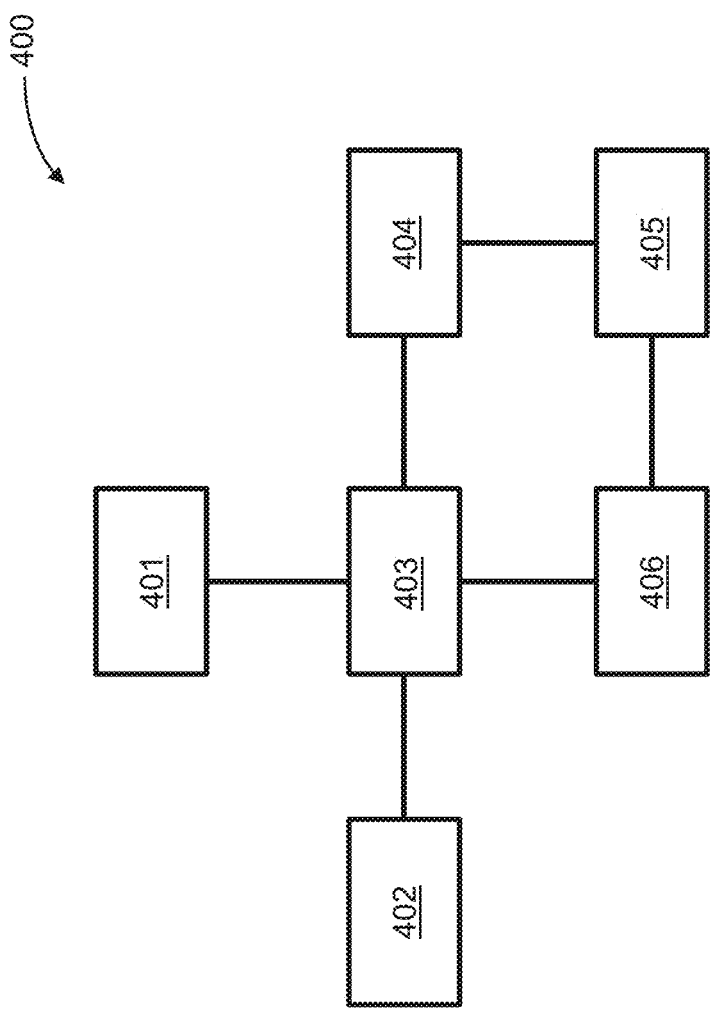
FIG. 4 is a block diagram showing an example of motor power recycling system in accordance with an embodiment of the disclosure.

FIG. 4 is a block diagram showing an example of motor power recycling system in accordance with an embodiment of the disclosure.

As shown in FIG. 4, the motor power recycling system in accordance with an embodiment of the disclosure may include a motor 401 configured to drive a corresponding rotor that is configured to generate lift for the UAV during flight of the UAV, a filtering unit 402 configured to filter a voltage from an power supply of the UAV, a three-phase rectification unit 403 connected to the filtering unit 402 and a motor 401 of the UAV, a sampling unit 404 configured to sample a current and a voltage from the three-phase rectification unit 403, a processing unit 405 configured to estimate a rotor position of the motor 401 based on the sampled voltage and sampled current from the sampling unit 404, and an output unit 406 configured to control the three-phase rectification unit 403 based on an estimated rotor position of the motor.

In some embodiments, the filtering unit 402 may include two filtering capacitors connected in parallel.

In some embodiments, the three-phase rectification unit 403 may include three parallel branches, each comprising two MOSFETs and one resistor connected in series. The resistors may be phase current sampling resistors.

In some embodiments, the sampling unit 404 may include a current sampling circuit and a voltage sampling circuit. The current sampling circuit may sample a three-phase current from the three-phase rectification unit 403. The voltage sampling unit may sample a three-phase voltage from the three-phase rectification unit 403.

In some embodiments, the processing unit 405 may include two CLARKE modules, a rotor position estimator, a PARK converting module, a PI regulator, a PARK inverse-converting module and a SVPWM (Space Vector Pulse Width Modulation) module. The two CLARKE modules may be respectively connected to the current sampling circuit and the voltage sampling circuit of the sampling unit 404. The output $I_{s\alpha}$, $I_{s\beta}$ and $u_{s\alpha}$, $u_{s\beta}$ of the CLARKE modules may be inputted to the rotor position estimator which outputs position information of the rotor. The $I_{s\alpha}$, $I_{s\beta}$ and $u_{s\alpha}$, $u_{s\beta}$ may also subjected to a PARK conversion at the PARK converting module, which outputs $I_d$, $I_q$. The $I_q$, $I_d$ may then be inputted to the PI regulator. The output $V_d$, $V_q$ of the PI regulator may be fed to the PARK inverse-converting module. The outputs $u_\alpha$, $u_\beta$ of the PARK inverse-converting module may be fed to the SVPWM module. The output of the SVPWM module may be fed to the output unit 406. The output unit 406 may control a current to the motor 401 by driving the three-phase rectification unit 403. For example, the output signals of the output unit 406 may be respectively fed to and control the six MOSFET of the three-phase rectification circuit 403.

In the process of converting the kinetic energy of the motor to electrical energy, such as a FOC (Field Orientated Control) method, a precise position of the rotor (rotor magnetic field) may be measured or calculated to generate a corresponding stator magnetic field, such that the maximum torque may be outputted directionally. The precise position information of the rotor may be measured by expensive sensors, e.g., encoders or resolvers. Alternatively, the position information of rotor may be obtained by complex software algorithms (i.e., observer). In present disclosure, the position information may be calculated estimated by observer which is low cost, maintenance-free and replacement-free.

In the embodiment as shown in FIG. 4, the voltage $V_a$, $V_b$ and $V_c$ may be the three-phase voltage of the motor 401, and the current $I_a$, $I_b$ and $I_c$ may be the three-phase current of the motor 401. The three-phase voltage $V_a$, $V_b$ and $V_c$ may subject to CLARKE conversion by the one of the CLARKE modules. The three-phase current $I_a$, $I_b$ and $I_c$ may subject to CLARKE conversion by the other one of the CLARKE modules. After the CLARKE conversion, $u_{s\alpha}$, $u_{s\beta}$ and $I_\alpha$, $I_\beta$ under a stationary reference frame may be obtained as:

$$\begin{bmatrix} u_{s\alpha} \\ u_{s\beta} \end{bmatrix} = \sqrt{\frac{2}{3}} \begin{bmatrix} 1 & -\frac{1}{2} & -\frac{1}{2} \\ 0 & \frac{\sqrt{3}}{2} & \frac{\sqrt{3}}{2} \end{bmatrix} \begin{bmatrix} V_a \\ V_b \\ V_c \end{bmatrix}$$

$$\begin{bmatrix} I_\alpha \\ I_\beta \end{bmatrix} = \sqrt{\frac{2}{3}} \begin{bmatrix} 1 & -\frac{1}{2} & -\frac{1}{2} \\ 0 & \frac{\sqrt{3}}{2} & \frac{\sqrt{3}}{2} \end{bmatrix} \begin{bmatrix} I_a \\ I_b \\ I_c \end{bmatrix}$$

The, $u_{s\alpha}$, $u_{s\beta}$ and $I_\alpha$, $I_\beta$ may be inputted to the rotor position estimator, which may output an estimated back electromotive force E$\alpha$est, E$\beta$est of the motor 401. The estimated position angle $\hat{\theta}$ of the rotor may be calculated by $$\hat{\theta} = \arctan\left(\frac{-E\alpha est}{E\beta est}\right)$$

In estimating the back electromotive force E$\alpha$est and E$\beta$est of the motor 401, a first-order filter may be employed, thus a phase deviation may be introduced. Here, the phase deviation may have to be compensated.

The phase deviation introduced by the first-order filter may be:

$$\theta comp1 = \arctan\left(\frac{\omega}{fc1}\right)$$

$$\theta comp2 = \arctan\left(\frac{\omega}{f2}\right)$$

The estimated position angle of the rotor after compensation may be:

$$\theta = \hat{\theta} + \theta comp1 + \theta comp2$$

The estimated position angle of the rotor may then subject to a PARK conversion at the PARK converting module, which outputs $I_d$, $I_q$:

$$\begin{bmatrix} I_d \\ I_q \end{bmatrix} = \begin{bmatrix} \cos\theta & \sin\theta \\ -\sin\theta & \cos\theta \end{bmatrix} \begin{bmatrix} I_\alpha \\ I_\beta \end{bmatrix}$$

The $I_d$, $I_q$ may then be inputted to the PI regulator, which outputs $V_d$, $V_q$. The $V_d$, $V_q$ may be fed to the PARK inverse-converting module, and we obtain $V_\alpha$, $V_\beta$:

$$\begin{bmatrix} V_\alpha \\ V_\beta \end{bmatrix} = \begin{bmatrix} \cos\theta & -\sin\theta \\ \sin\theta & \cos\theta \end{bmatrix} \begin{bmatrix} V_d \\ V_q \end{bmatrix}$$

The output voltage $V_\alpha$, $V_\beta$ may then be fed to the SVPWM module, where the voltage $V_\alpha$, $V_\beta$ may be modulated. The output of the SVPWM module may be inputted to the output unit 406, which controls the ON-OFF of the six MOSFETs of the three-phase rectification circuit 403 and controls a current to the motor 401. The rotating speed of the motor 401 may depend on a magnitude of the fed current.

By implementing the motor power recycling system as shown in FIG. 4, the precise position information of the rotor may be estimated, which may be used in the process of recycling motor power.

Figure 5:
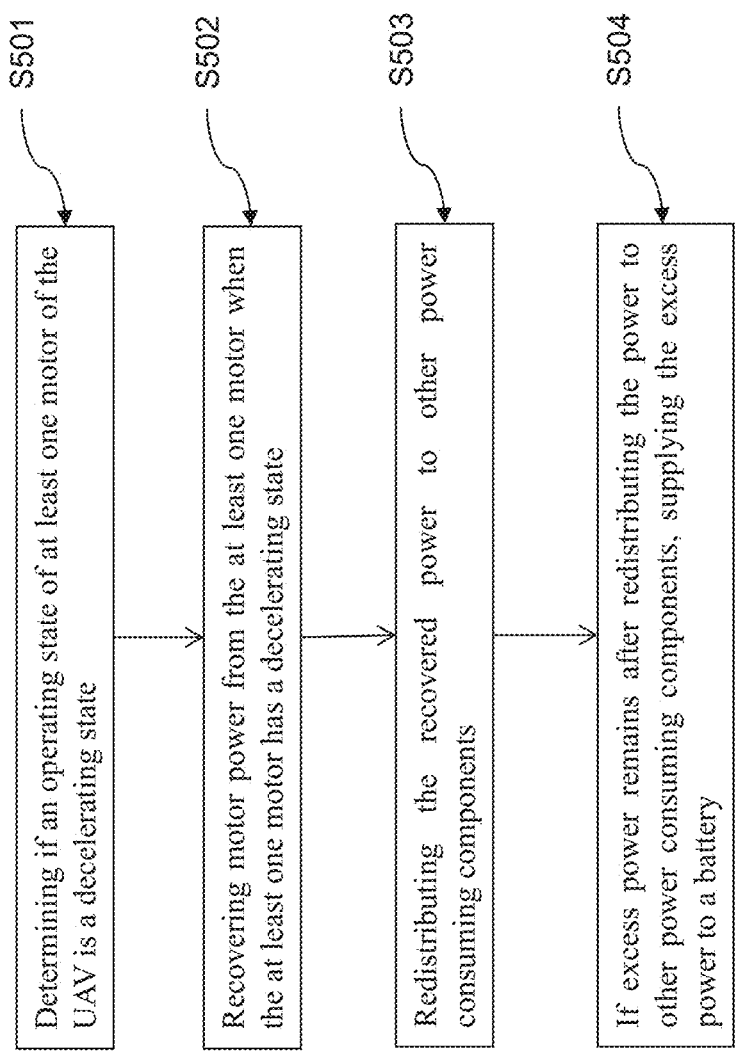
FIG. 5 is a flow chart illustrating a method of recycling motor power of a UAV, in accordance with an embodiment of the disclosure.

FIG. 5 is a flow chart illustrating a method of recycling motor power of a UAV, in accordance with an embodiment of the disclosure.

In step S501, the operating state of at least one motor of the UAV may be determined, with aid of one or more processors. The one or more processors may be a flight controller of the UAV, or dedicated processors for the motor power recycling, onboard or off-board the UAV.

The one or more processors may be such as a programmable processor (e.g., a central processing unit (CPU)). The one or more processors may be operatively coupled to a non-transitory computer readable medium. The non-transitory computer readable medium may store logic, code, and/or program instructions executable for performing one or more steps. The non-transitory computer readable medium may include one or more memory units (e.g., removable media or external storage such as an SD card or random access memory (RAM)). In some instances, the one or more processors may be onboard the UAV. Alternatively, the one or more processors may be off-board the UAV, and a determination on the operating state of the at least one motor may be wirelessly transmitted to the flight controller of the UAV.

In some embodiments, the operating state of each motor of the plurality may be determined. In some instances, the plurality of motors may have same operating state, e.g., all the motors may be in an accelerating state or in a decelerating state. In other instances, the plurality of motors may have different operating state, e.g., one or more motors may be in an accelerating state while other motors may be in a decelerating state.

Various methods may be employed to determine an operating state of the motor in step S501. In some embodiments, determining an operating state of the motor may include detecting an acceleration of the motor. In this case, a motor may be determined as having a decelerating state when the acceleration of the motor is negative. In some instances, a sensor or detector may be built in the motor to detect an acceleration of the motor. In some instances, a sensor or detector may be in electrical connection to the motor to detect an acceleration of the motor. Alternatively, a sensor or detector may be wirelessly connected to the motor to detect an acceleration of the motor.

In some embodiments, determining an operating state of the motor may include determining whether a back electromotive force of the motor is higher than a voltage applied on the motor. In this case, a motor may be determined as having a decelerating state when the back electromotive force of the motor is higher than the voltage applied on the motor. In some instances, a sensor or detector may be built in the motor to detect a back electromotive force of the motor. In some instances, a sensor or detector may be in electrical connection to the motor to detect a back electromotive force of the motor. Alternatively, a sensor or detector may be wirelessly connected to the motor to detect a back electromotive force of the motor.

In some embodiments, determining an operating state of the motor may include determining whether a q-axis current of the motor is negative. In this case, a motor may be determined as having a decelerating state when the q-axis current of the motor is negative. In some instances, a sensor or detector may be built in the motor to detect a q-axis current of the motor. In some instances, a sensor or detector may be in electrical connection to the motor to detect a q-axis current of the motor. Alternatively, a sensor or detector may be wirelessly connected to the motor to detect a q-axis current of the motor.

If at least one motor of the plurality is determined as in a decelerating state, the motor power from the at least one motor may be recycled in step S502. The theory of converting the kinetic energy of the motor to electrical energy and process of recycling the power have been discussed herein above. For example, recycling power from the motor in a decelerating state may include recycling an electrical current generated by a back electromotive force of the motor.

In some embodiments, recycling power from the at least one motor may be conducted using a FOC (Field Orientated Control) method, which may include determining a position of the rotor of the motor, as discussed herein above.

In step S503, the recycled power from the at least motor in a decelerating state may be directly redistributed to other power consuming components onboard the UAV. In some embodiments, the recycled power may be redistributed to other power consuming components through a power bus, which is in electrical connection/communication with battery or battery assembly and each power consuming component in parallel. In some embodiments, the recycled power may be redistributed to other power consuming components through individual electrical paths. In some embodiments, the recycled power may be redistributed to other power consuming components without interacting with intermediary power storage or power consuming components.

The power consuming components may include one or more motors in an accelerating state, flight controller, sensors, inertial measurement unit, communication unit onboard the UAV, as discussed herein above. In some embodiment, if not all the motors are in a decelerating state, the recycled power from the at least one motor in a decelerating state may be directly supplied to other motors in an accelerating state. In other embodiments, if all the motors are in a decelerating state, the recycled power from the motors in a decelerating state may be directly supplied to a camera, sensors, and/or flight controllers of the UAV.

If excess power remains after redistributing the power to other power consuming components in step S503, the excess power may be supplied to a battery or battery assembly in step S504. The battery may store the excess power and supply it to the electrical components later.

Figure 6:
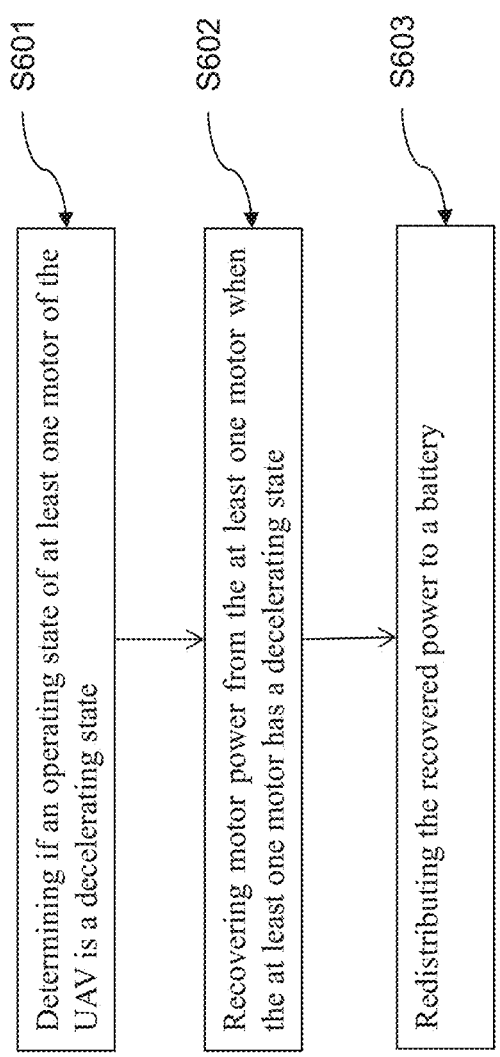
FIG. 6 is a flow chart illustrating a method of recycling motor power of a UAV, in accordance with another embodiment of the disclosure.

FIG. 6 is a flow chart illustrating a method of recycling motor power of a UAV, in accordance with another embodiment of the disclosure.

In step S601, it is determined if an operating state of at least one motor of the UAV is a decelerating state. In step S602, motor power from the at least one motor in a decelerating state may be recycled. The steps S601 and S602 of the embodiment shown in FIG. 6 may be substantially identical to steps S501 and S502 of the embodiment shown in FIG. 5, respectively.

The embodiments shown in FIG. 6 may differ from the embodiment shown in FIG. 5 in that, the recycled power from the at least one motor in a decelerating state may be directly supplied to the battery or battery assembly onboard the UAV, rather than to other power consuming components. For example, in step S603, the recycled power from step S602 may be redistributed to a battery or battery assembly of the UAV. In some embodiments, the recycled power may be redistributed to the battery or battery assembly through individual electrical paths. In some embodiments, the recycled power may be redistributed to the battery or battery assembly through a power bus, which is in electrical connection/communication with battery or battery assembly and each power consuming component in parallel. The battery may or may not optionally distribute energy stored in the battery to the at least one motor when needed and/or any other motors or other power consuming components.

Figure 7:
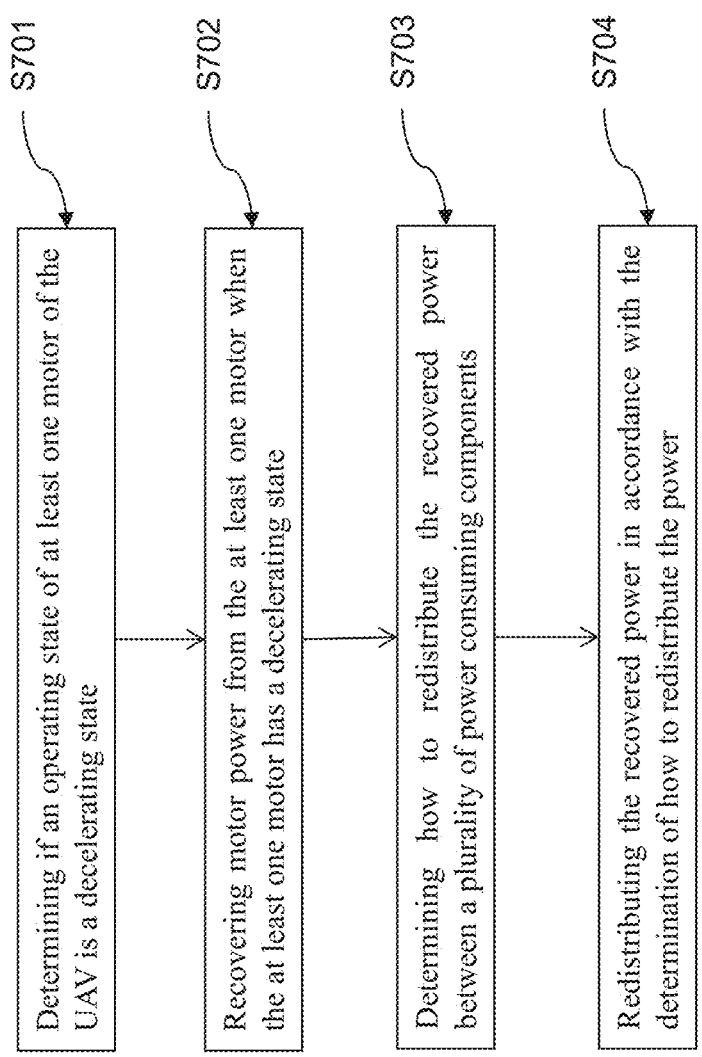
FIG. 7 is a flow chart illustrating a method of recycling motor power of a UAV, in accordance with yet another embodiment of the disclosure.

FIG. 7 is a flow chart illustrating a method of recycling motor power of a UAV, in accordance with yet another embodiment of the disclosure.

In step S701, it may determine whether an operating state of at least one motor of the UAV is a decelerating state. In step S702, motor power from the at least one motor in a decelerating state may be recycled. The processes in steps S701 and S702 of the embodiment shown in FIG. 7 may be substantially identical to those in steps S501 and S502 of the embodiment shown in FIG. 5, respectively.

In step S703, a determination may be made on how to redistribute the recycled power between a plurality of power consuming components, with aid of one or more processors. The one or more processors may be a flight controller of the UAV, or dedicated processors for the motor power recycling, onboard or off-board the UAV.

In some embodiments, determining how to redistribute the recycled power between a plurality of power consuming components may include determining an apportionment of the power between the plurality of power consuming components. The apportionment of the power may include at least one component of the plurality of power consuming components not receiving any of the power. In some instances, the apportionment of the power between the plurality of power consuming components may be unequal.

In some embodiments, determining how to redistribute the recycled power between a plurality of power consuming components may include assessing an amount of power consumption of at least one of the plurality of power consuming components.

In some embodiments, the plurality of power consuming components may include one or more other motors in an accelerating state, a battery or battery assembly configured to store energy, and/or sensors, camera, inertial measurement modules, communication modules, flight controllers, navigation modules.

In step S704, the recycled power form the at least one motor may be redistributed between the plurality of power consuming components, in accordance with the determination of how to redistribute the power, which is made in step S703.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence. In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$. 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$. 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$. 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 8:
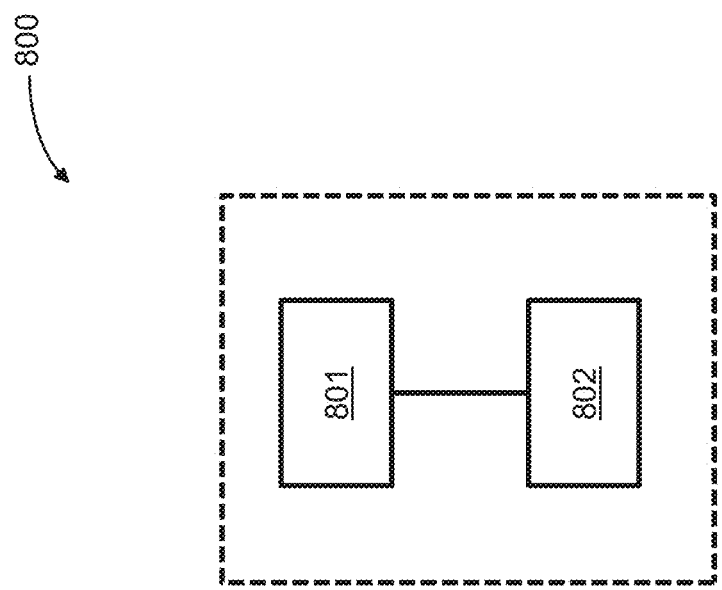
FIG. 8 shows an example of an electronic speed controller of UAV, in accordance with an embodiment of the disclosure.

FIG. 8 shows an example of an electronic speed controller (ESC) 800 of UAV, in accordance with an embodiment of the disclosure. The electronic speed controller 800 of UAV may include an output circuit 801 configured to control a current to at least one motor of the UAV, and a processor 802 in connection with the output circuit 801.

In some embodiments, the processor 802 may be configured to determine an operating state of the at least one motor of UAV, and recycle power from the at least one motor when the at least one motor has an operating state that is a decelerating state. In some instances, the processor 802 may be configured to determine an operating state of each motor of the plurality of motors of the UAV, and recycle power from the any motor in a decelerating state.

In some embodiment, the processor 802 may be configured to (1) determine an operating state of the at least one motor of UAV, (2) determine how to redistribute power from the at least one motor between a plurality of components when the at least one motor has an operating state that is a decelerating; and (3) redistribute the power in accordance with the determination of how to redistribute the power. In some instances, determining how to redistribute power may include determining an apportionment of the power between the plurality of components. Alternatively, determining how to redistribute power may include assessing an amount of power consumption of the at least one of the plurality of components.

Although one processor 802 is shown in FIG. 8 as an example, the electronic speed controller 800 may include one or more processors configured to determine an operating state of the at least one motor of UAV, determine how to redistribute power, and recycle power from the at least one motor in a decelerating state.

Figure 9:
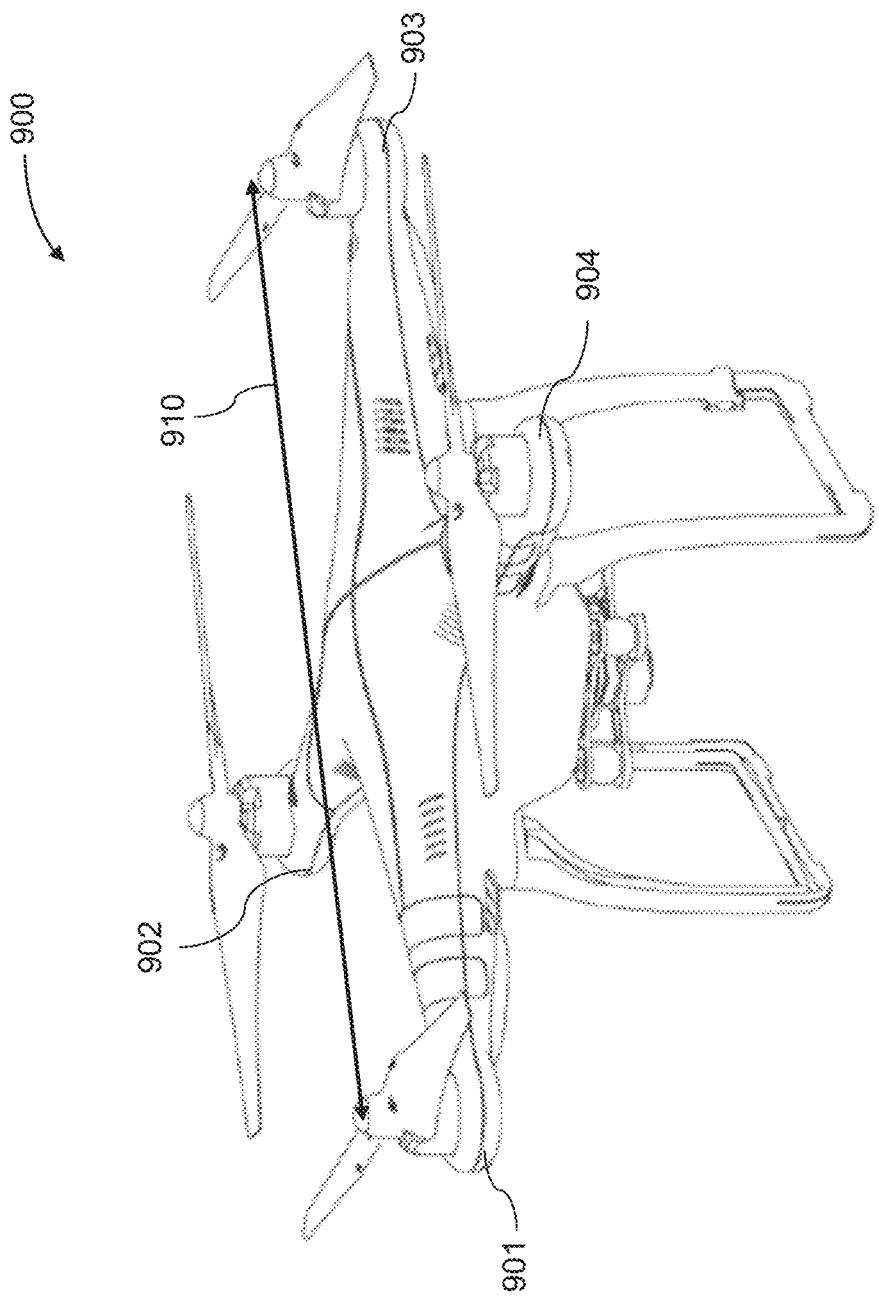
FIG. 9 illustrates an appearance of UAV in accordance with embodiments of the present disclosure.

FIG. 9 illustrates an unmanned aerial vehicle (UAV) 900, in accordance with embodiments of the present disclosure. The UAV may be an example of a movable object as described herein. The UAV 900 can include a propulsion system having four motors 901, 902, 903, and 904. Any number of motors may be provided (e.g., one, two, three, four, five, six, or more). The motors, rotor assemblies, or other propulsion systems of the unmanned aerial vehicle may enable the unmanned aerial vehicle to hover/maintain position, change orientation, and/or change location. The distance between shafts of opposite motors/rotors can be any suitable length 910. For example, the length 910 can be less than or equal to 2 m, or less than equal to 5 m. In some embodiments, the length 910 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

The UAV 900 may be controlled by a human or an autonomous control system (e.g., a computer control system), or any suitable combination thereof. The movable object can be an autonomous or semi-autonomous UAV. In some embodiments, the flight of UAV may be controlled by a remote terminal, and the decelerating state of at least one motor may be initiated in response to a signal to cause a braking of the at least one motor. In other embodiments, the UAV may be an autonomous UAV of which the flight may be controlled by a pre-set program, and the decelerating state of at least one motor may be initiated in response to a pre-set signal to cause a braking of the at least one motor.

The motors 901, 902, 903, and 904 of the UAV 900 may be connected to a battery or battery assembly onboard the UAV through a power bus in parallel. The battery or battery assembly may be disposed within a housing of the UAV, or outside the housing. The battery or battery assembly may provide power to the motors 901, 902, 903, and 904 via the power bus. The battery or battery assembly may also receive the recycled power from at least one of the motors 901, 902, 903, and 904 via the power bus and stores the recycled power therein.

The UAV 900 may implement the method of recycling motor power of present disclosure when at least one motor is in a decelerating state. For example, when the UAV 900 is performing a rotating flight by controlling motors 901 and 902 in a decelerating state while motors 903 and 904 in an accelerating state, a current may be generated from motors 901 and 902 which are determined as in a decelerating state. In some instances, the recycled power may be directly redistributed from motors 901 and 902 to motors 903 and 904 as well as other electrical components such as sensors onboard the UAV 900 via a power bus or individual electrical paths. The recycled power may be redistributed to other power consuming components without interacting with intermediary power storage or power consuming components. Optionally, any excess power may be fed to the battery or battery assembly, if any excess power remains after supplying the other power consuming components. Optionally, the recycled power may be directly fed to the battery or battery assembly which may store the power, rather than to other power consuming components. Alternatively, the recycled power may be redistributed from motors 901 and 902 in accordance to a determination on how to redistribute the power, as discussed herein above.

The method of motor power recycling of present disclosure may increase the energy efficiency of a UAV. For example, the power fed to a motor during an accelerating operation may be collected in a decelerating operation, which may otherwise be consumed by damping of blades. The recycled power from at least one motor in a decelerating state may be redistributed to other power consuming components, such as other motors in an accelerating state or sensors onboard the UAV. The method of motor power recycling of present disclosure may be executed when at least one motor of the UAV is determined as in a decelerating state, not necessarily when all the motors are in a decelerating state.

The method of motor power recycling of present disclosure may particularly work for UAVs with frequent accelerating-decelerating operations. The accelerating-decelerating operations may be initiated in response to a signal to cause a braking of at least one motor of the UAV, which may be sent from a remote controller. The method of motor power recycling of present disclosure may increase the energy efficiency of a UAV by at least 10%, when compared to traditional Brushless Direct Current Motor (BLDC) controlling. As a result, a battery life of the UAV may be significantly increased.

Figure 10:
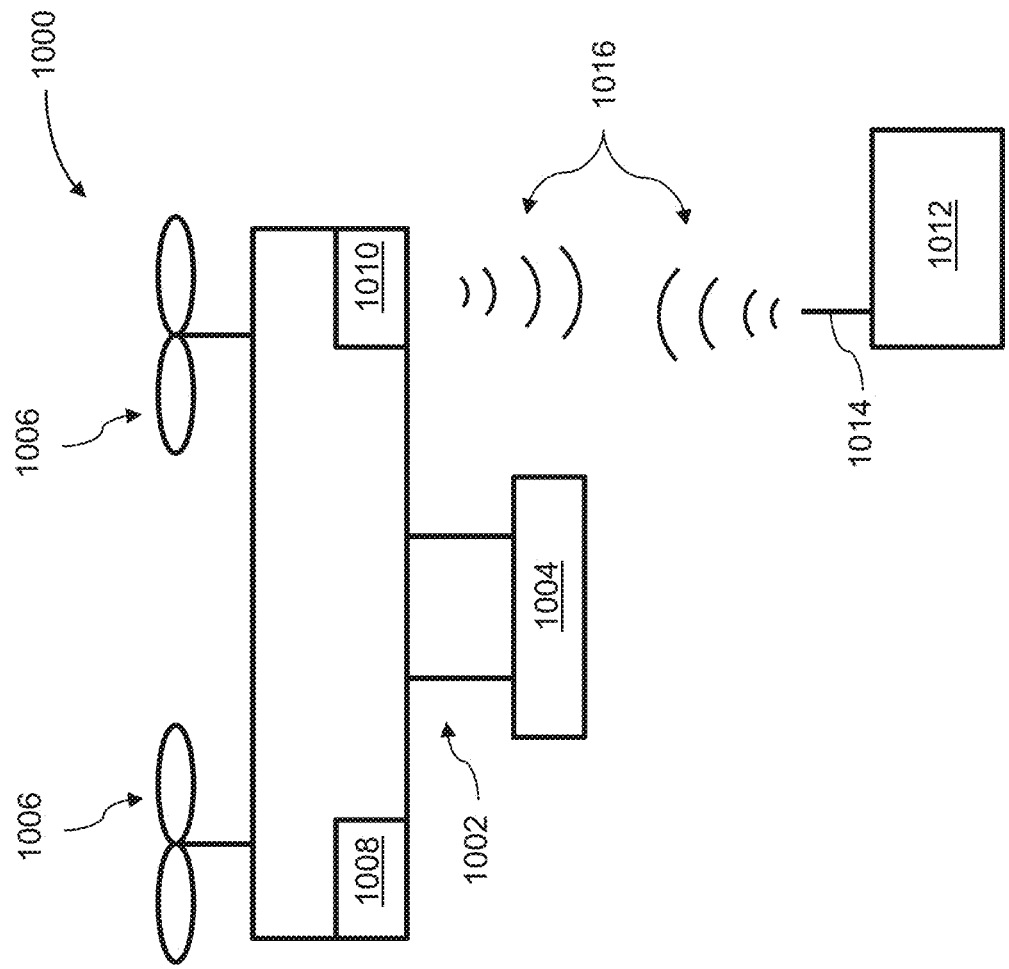
FIG. 10 illustrates a movable object including a carrier and a payload, in accordance with embodiments of the present disclosure.

FIG. 10 illustrates a movable object 1000 including a carrier 1002 and a payload 1004, in accordance with embodiments of the present disclosure. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communi-cate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
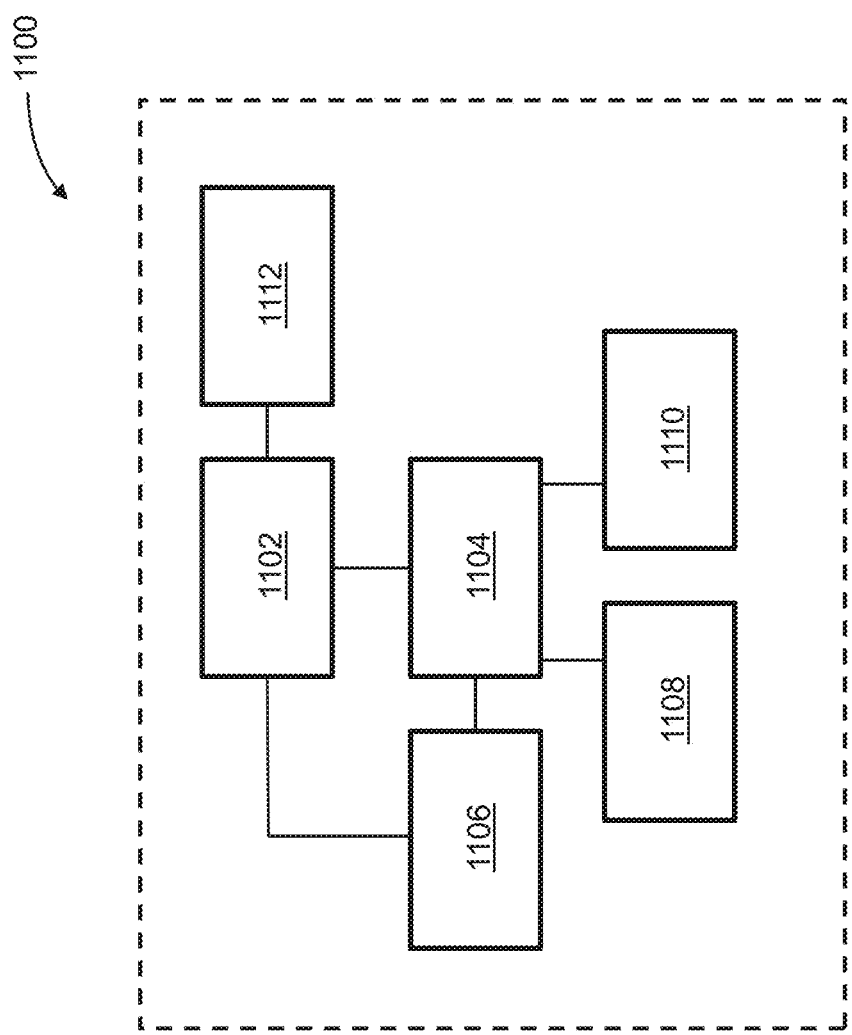
FIG. 11 is a schematic illustration by way of block diagram of a system for controlling a movable object, in accordance with embodiments of the present disclosure.

FIG. 11 is a schematic illustration by way of block diagram of a system 1100 for controlling a movable object, in accordance with embodiments of the present disclosure. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method of redistributing motor power of an unmanned aerial vehicle (UAV), said method comprising:
   determining, with aid of one or more processors, an operating state of a motor of the UAV, wherein the motor is configured to drive a corresponding rotor to generate lift for the UAV;
   determining, with aid of the one or more processors, how to redistribute power recycled from the motor between a plurality of components when the motor has an operating state that is a decelerating state, wherein the plurality of components comprises another motor of the UAV; and
   redistributing the power in accordance with the determination of how to redistribute the power.

2. The method of claim 1, wherein determining how to redistribute the power includes determining an apportionment of the power between the plurality of components.

3. The method of claim 2, wherein the apportionment of the power includes at least one component of the plurality of components not receiving any of the power.

4. The method of claim 2, wherein the apportionment of the power between the plurality of components is unequal.

5. The method of claim 1, wherein the plurality of components further comprises a battery configured to store energy.

6. The method of claim 5, wherein the battery is configured to provide energy to the motor when the motor is in an accelerating state.

7. The method of claim 1, wherein determining how to redistribute the power includes assessing an amount of power consumption of at least one of the plurality of components.

8. The method of claim 1, further comprising remotely controlling movement of the UAV with aid of a remote terminal while receiving power from the motor.

9. The method of claim 1, wherein the corresponding rotor generates lift for the UAV while redistributing power from the motor takes place.

10. The method of claim 1, wherein rotors driven by other motors generate lift for the UAV while redistributing power from the motor takes place.

11. The method of claim 1, wherein redistributing power from the motor comprises converting kinetic energy from motion of the motor to electrical energy.

12. The method of claim 1, wherein the motor has the operating state that is the decelerating state when an acceleration of the motor is negative.

13. The method of claim 1, wherein redistributing the power from the motor comprises redistributing an electrical current generated by a back electromotive force of the motor.

14. The method of claim 1, further comprising determining whether a back electromotive force of the motor is higher than a voltage applied on the motor.

15. The method of claim 14, wherein the motor has the operating state that is the decelerating state when the back electromotive force of the motor is higher than the voltage applied on the motor.

16. The method of claim 14, wherein redistributing the power from the motor comprises redistributing an electrical current generated by the back electromotive force of the motor.

17. A system for redistributing motor power of an unmanned aerial vehicle (UAV), said system comprising:
   a motor configured to drive a rotor blade to generate lift for the UAV; and one or more processors configured to, individually or collectively:

determine an operating state of the motor; and determine how to redistribute power recycled from the motor between a plurality of components when the motor has an operating state that k a decelerating state, wherein the plurality of components comprises one or more other motors of the UAV;

at least one energy distribution unit configured to redistribute the power in accordance with the determination of how to redistribute the power.

18. The system of claim 17, wherein redistributing the power includes:

supplying excess part of the power that is not supplied to the one or more other motors to a battery.

19. The system of claim 18, wherein the battery is connected in parallel with the motor through a power bus.

20. The system of claim 17, wherein the one or more processors are configured to, individually or collectively, determine whether a back electromotive force of the motor is higher than a voltage applied on the motor.

* * * * *